US008502825B2

(12) United States Patent
Zalewski et al.

(10) Patent No.: US 8,502,825 B2
(45) Date of Patent: Aug. 6, 2013

(54) AVATAR EMAIL AND METHODS FOR COMMUNICATING BETWEEN REAL AND VIRTUAL WORLDS

(75) Inventors: Gary Zalewski, Oakland, CA (US); Tomas Gillo, Brighton (GB); Mitchell Goodwin, London (GB); Scott Waugaman, London (GB); Attila Vass, Foster City, CA (US)

(73) Assignees: Sony Computer Entertainment Europe Limited, London (GB); Sony Computer Entertainment America LLC, Foster City, CA (US)

( * ) Notice: Subject to any disclaimer, the term of this patent is extended or adjusted under 35 U.S.C. 154(b) by 1325 days.

(21) Appl. No.: 11/682,299

(22) Filed: Mar. 5, 2007

(65) Prior Publication Data

US 2008/0235582 A1 Sep. 25, 2008

Related U.S. Application Data

(60) Provisional application No. 60/892,397, filed on Mar. 1, 2007.

(30) Foreign Application Priority Data

Mar. 1, 2007 (GB) .................................. 0703974.6

(51) Int. Cl.
*G06T 13/00* (2011.01)
(52) U.S. Cl.
USPC .......................................... 345/473; 715/706
(58) Field of Classification Search
USPC .......................................... 345/473; 715/706
See application file for complete search history.

(56) References Cited

U.S. PATENT DOCUMENTS

| 5,720,619 A | 2/1998 | Fisslinger |
| 5,880,731 A | 3/1999 | Liles et al. |
| 5,926,179 A | 7/1999 | Matsuda et al. |
| 5,977,968 A | 11/1999 | Le Blanc |

(Continued)

FOREIGN PATENT DOCUMENTS

| WO | WO 2004/073814 A1 | 2/2004 |
| WO | WO 2004/073815 A1 | 2/2004 |

(Continued)

OTHER PUBLICATIONS

Office Action dated Jun. 29, 2009 for U.S. Appl. No. 11/682,281.
Office Action dated Mar. 31, 2009 for U.S. Appl. No. 11/682,284.
Office Action dated Apr. 30, 2009 for U.S. Appl. No. 11/682,292.
Non-final Office Action dated Sep. 15, 2009 for U.S. Appl. No. 11/682,298.

(Continued)

*Primary Examiner* — Maurice L McDowell, Jr.
(74) *Attorney, Agent, or Firm* — Joshua D. Isenberg; JDI Patent

(57) ABSTRACT

A method for and system for communicating using a virtual world are disclosed. In the method an avatar may be associated with a source of an email. An email may be generated within the virtual world and one or more images of an avatar may be associated with the email. The email may be sent to a real device and the one or more images may be presented at a destination of the email. The system may comprise one or more processors configured to generate a virtual world; associate an avatar with a source of an email; generate an email within the virtual world; associate one or more images of an avatar with the email; send the email to a real device; and present the one or more images at a destination of the email.

23 Claims, 9 Drawing Sheets

(56) References Cited

U.S. PATENT DOCUMENTS

| | | | |
|---|---|---|---|
| 6,121,953 A | 9/2000 | Walker | |
| 6,212,502 B1 | 4/2001 | Ball et al. | |
| 6,215,498 B1 | 4/2001 | Filo et al. | |
| 6,476,830 B1 | 11/2002 | Farmer et al. | |
| 6,545,682 B1 | 4/2003 | Ventrella et al. | |
| 6,784,901 B1 | 8/2004 | Harvey et al. | |
| 6,834,389 B1 | 12/2004 | Glass | |
| 6,836,515 B1 | 12/2004 | Kay | |
| 6,904,408 B1 | 6/2005 | McCarthy et al. | |
| 6,910,186 B2 | 6/2005 | Kim | |
| 6,976,846 B2 | 12/2005 | Dupont | |
| 7,036,082 B1* | 4/2006 | Dalrymple et al. | 715/757 |
| 7,073,129 B1 | 7/2006 | Robarts et al. | |
| 7,086,005 B1 | 8/2006 | Matsuda | |
| 7,203,356 B2 | 4/2007 | Gokturk et al. | |
| 7,272,662 B2 | 9/2007 | Chesnais et al. | |
| 7,412,077 B2 | 8/2008 | Li et al. | |
| 7,468,729 B1 | 12/2008 | Levinson | |
| 7,574,332 B2 | 8/2009 | Ballin et al. | |
| 7,647,560 B2 | 1/2010 | Macauley et al. | |
| 7,671,861 B1* | 3/2010 | Ostermann et al. | 345/473 |
| 7,676,237 B2 | 3/2010 | Daigle | |
| 7,783,061 B2 | 8/2010 | Zalewski et al. | |
| 7,908,554 B1* | 3/2011 | Blattner | 715/706 |
| 2001/0025261 A1 | 9/2001 | Olefson | |
| 2001/0046228 A1 | 11/2001 | Tahtinen et al. | |
| 2002/0005865 A1 | 1/2002 | Hayes-Roth | |
| 2002/0064149 A1 | 5/2002 | Elliott et al. | |
| 2002/0090985 A1 | 7/2002 | Tochner et al. | |
| 2002/0113820 A1 | 8/2002 | Robinson et al. | |
| 2002/0128952 A1 | 9/2002 | Melkomian et al. | |
| 2002/0154174 A1 | 10/2002 | Redlich et al. | |
| 2003/0057884 A1 | 3/2003 | Dowling et al. | |
| 2003/0156134 A1 | 8/2003 | Kim | |
| 2003/0206170 A1* | 11/2003 | Bickmore et al. | 345/473 |
| 2003/0235341 A1 | 12/2003 | Gokturk et al. | |
| 2004/0030787 A1 | 2/2004 | Jandel et al. | |
| 2004/0060067 A1 | 3/2004 | Yi | |
| 2004/0105004 A1 | 6/2004 | Rui | |
| 2004/0153557 A1 | 8/2004 | Shochet et al. | |
| 2004/0179038 A1 | 9/2004 | Blattner et al. | |
| 2004/0207597 A1 | 10/2004 | Marks | |
| 2004/0255015 A1 | 12/2004 | Fitzpatrick et al. | |
| 2004/0255027 A1 | 12/2004 | Vass et al. | |
| 2005/0054381 A1 | 3/2005 | Lee et al. | |
| 2005/0083333 A1 | 4/2005 | Gordon | |
| 2005/0261032 A1 | 11/2005 | Seo et al. | |
| 2006/0003814 A1 | 1/2006 | Moody et al. | |
| 2006/0178968 A1 | 8/2006 | Jung et al. | |
| 2006/0224546 A1 | 10/2006 | Ballin et al. | |
| 2006/0233389 A1 | 10/2006 | Mao | |
| 2006/0264258 A1 | 11/2006 | Zalewski et al. | |
| 2006/0264259 A1 | 11/2006 | Zalewski et al. | |
| 2006/0277571 A1 | 12/2006 | Marks | |
| 2007/0002057 A1 | 1/2007 | Danzig et al. | |
| 2007/0013515 A1 | 1/2007 | Johnson et al. | |
| 2007/0025562 A1 | 2/2007 | Zalewski | |
| 2007/0037561 A1 | 2/2007 | Bowen et al. | |
| 2007/0074114 A1 | 3/2007 | Adjali et al. | |
| 2007/0074206 A1 | 3/2007 | Iwamoto | |
| 2007/0074207 A1 | 3/2007 | Bates | |
| 2007/0074212 A1 | 3/2007 | Bates | |
| 2007/0074221 A1 | 3/2007 | Stenson | |
| 2007/0082309 A1 | 4/2007 | Zia | |
| 2007/0083755 A1 | 4/2007 | Iwamoto | |
| 2007/0113181 A1 | 5/2007 | Blattner et al. | |
| 2007/0149282 A1 | 6/2007 | Lu et al. | |
| 2007/0192727 A1 | 8/2007 | Finley et al. | |
| 2007/0198178 A1 | 8/2007 | Trimby et al. | |
| 2007/0198628 A1 | 8/2007 | Bates | |
| 2007/0260340 A1 | 11/2007 | Mao | |
| 2008/0059570 A1 | 3/2008 | Bill | |
| 2008/0059578 A1 | 3/2008 | Albertson et al. | |
| 2008/0096665 A1 | 4/2008 | Cohen | |
| 2008/0120558 A1 | 5/2008 | Nathan et al. | |
| 2008/0214253 A1 | 9/2008 | Gillo | |
| 2008/0215679 A1 | 9/2008 | Gillo | |
| 2008/0215971 A1 | 9/2008 | Gillo | |
| 2008/0215972 A1 | 9/2008 | Zalewski | |
| 2008/0215973 A1 | 9/2008 | Zalewski | |
| 2008/0246759 A1 | 10/2008 | Summers | |
| 2009/0013052 A1 | 1/2009 | Robarts et al. | |

FOREIGN PATENT DOCUMENTS

| | | |
|---|---|---|
| WO | WO 2008/104782 A2 | 9/2008 |
| WO | WO 2008/104783 A1 | 9/2008 |
| WO | WO 2008/104784 A1 | 9/2008 |
| WO | WO 2008/104785 A1 | 9/2008 |

OTHER PUBLICATIONS

ChanSu Lee, SangWon Ghyme, ChanJong Park, KwangYun Wohn, The Control of Avatar Motion Using Hand Gesture, VRST'98, Nov. 2-5, 1998, p. 59-65.

Non-final Office Action dated Sep. 15, 2009 for U.S. Appl. No. 11/682,287.

Notice of Allowance and Fee(s) Due dated Oct. 6, 2009 for U.S. Appl. No. 11/682,284.

Final Office Action dated Nov. 12, 2009 for U.S. Appl. No. 11/682,292.

U.S. Appl. No. 60/892,397 to Tomas Gillo et al, filed Mar. 1, 2007.

GB Patent Application No. 070394.6 entitled "Entertainment Device", filed Mar. 1, 2007.

International Search Report and Written Opinion of the International Searching Authority dated Oct. 14, 2008—International Patent Application No. PCT/US08/55037. 10 pages.

"Cell Broadband Engine Architecture," copyright International Business Machines Corporation, Sony Computer Entertainment Incorporated, Toshiba Corporation Aug. 8, 2005, 319 pages, which may be downloaded at http://cell.scei.co.jp/.

Final Office Action issued in U.S. Appl. No. 11/682,281 mailed Dec. 24, 2009.

Notice of Allowance and Fees Due issued in U.S. Appl. No. 11/682,284 mailed Jan. 20, 2010.

Final Office Action dated Mar. 22, 2010 issued for U.S. Appl. No. 11/682,298.

Final Office Action dated Apr. 28, 2010 issued for U.S. Appl. No. 11/682,287.

Office Action dated Jul. 13, 2010, 2010 issued for U.S. Appl. No. 11/682,298.

Notice of Allowance and Fees Due dated Jun. 23, 2010 issued for U.S. Appl. No. 11/682,284.

Office Action dated Sep. 23, 2010 issued for U.S. Appl. No. 11/682,287.

Office Action dated Oct. 5, 2010 issued for U.S. Appl. No. 11/682,292.

Office Action dated Aug. 31, 2011 issued for U.S. Appl. No. 11/682,292.

Office Action dated Nov. 10, 2010 issued for U.S. Appl. No. 11/682,284.

Non-Final Office Action dated Feb. 2, 2012 issued for U.S. Appl. No. 11/682,298.

Final Office Action dated Jul. 5, 2012 for U.S. Appl. No. 11/682,298.

Non- Final Office Action dated Oct. 25, 2012 issued for U.S. Appl. No. 11/682,298.

Francesca Barrientos, Continuous Control of Avatar Gesture (Nov. 2000). http://vislab.cs.vt.edu/-quek/Classes/Aware+Embodiedinteraction/PAPERS/BarOO.pdf.

Array—Definition and More from the Free Merriam-Webster Dictionary—download from http://www.merriam-webster.com/dictionary/array?show=1&t=1294163923 on Jan. 4, 2011, 2 pages.

Final Office Action mailed date Dec. 12, 2012 for US Patent Application Na 111682,292 (Attorney Docket No: SCEA06108US00).

Final Office Action dated Mar. 29, 2013 issued for U.S. Appl. No. 11/682,298.

Advisory Office Action dated Jun. 21, 2013 issued for U.S. Appl. No. 11/682,298.

* cited by examiner

AVATAR EMAIL AND METHODS FOR COMMUNICATING BETWEEN REAL AND VIRTUAL WORLDS

CROSS-REFERENCE TO RELATED APPLICATION

This application claims the benefit of priority of commonly-assigned, co-pending United Kingdom patent application no. 0703974.6, entitled "ENTERTAINMENT DEVICE", filed Mar. 1, 2007, the entire disclosures of which are incorporated herein by reference.

This application claims the benefit of priority of co-pending U.S. Provisional patent application No. 60/892,397, entitled "VIRTUAL WORLD COMMUNICATION SYSTEMS AND METHODS", filed Mar. 1, 2007, the entire disclosures of which are incorporated herein by reference.

This application is related to commonly-assigned, co-pending U.S. patent application Ser. No. 11/682,281, to Tomas Gillo et al., entitled "SYSTEM AND METHOD FOR COMMUNICATING WITH A VIRTUAL WORLD", filed Mar. 5, 2007, the entire disclosures of which are incorporated herein by reference.

This application is related to commonly-assigned, co-pending U.S. patent application Ser. No. 11/682,284, to Tomas Gillo et al., entitled "SYSTEM AND METHOD FOR ROUTING COMMUNICATIONS AMONG REAL AND VIRTUAL COMMUNICATION DEVICES", filed Mar. 5, 2007, the entire disclosures of which are incorporated herein by reference.

This application is related to commonly-assigned, co-pending U.S. patent application Ser. No. 11/682,287, to Tomas Gillo et al., entitled "SYSTEM AND METHOD FOR COMMUNICATING WITH AN AVATAR", filed Mar. 5, 2007, the entire disclosures of which are incorporated herein by reference.

This application is related to commonly-assigned, co-pending U.S. patent application Ser. No. 11/682,292, to Tomas Gillo et al., entitled "MAPPING USER EMOTIONAL STATE TO AVATAR IN A VIRTUAL WORLD", filed Mar. 5, 2007, the entire disclosures of which are incorporated herein by reference.

This application is related to commonly-assigned, co-pending U.S. patent application Ser. No. 11/682,298, to Tomas Gillo et al., entitled "AVATAR CUSTOMIZATION", filed Mar. 5, 2007, the entire disclosures of which are incorporated herein by reference.

This application is related to commonly-assigned, co-pending United Kingdom patent application no. 0704225.2, entitled "ENTERTAINMENT DEVICE AND METHOD", filed Mar. 5, 2007, the entire disclosures of which are incorporated herein by reference.

This application is related to commonly-assigned, co-pending United Kingdom patent application no. 0704235.1, entitled "ENTERTAINMENT DEVICE AND METHOD", filed Mar. 5, 2007, the entire disclosures of which are incorporated herein by reference.

This application is related to commonly-assigned, United Kingdom patent application no. 0704227.8, entitled "ENTERTAINMENT DEVICE AND METHOD", filed Mar. 5, 2007, the entire disclosures of which are incorporated herein by reference.

This application is related to commonly-assigned, United Kingdom patent application no. 0704246.8, entitled "ENTERTAINMENT DEVICE AND METHOD", filed Mar. 5, 2007, the entire disclosures of which are incorporated herein by reference.

FIELD OF THE INVENTION

This invention is related to interactive computer entertainment and more specifically to communication among users of a virtual world.

BACKGROUND OF THE INVENTION

A virtual world is a simulated environment in which users may interact with each other via one or more computer processors. Users may appear on a video screen in the form of representations referred to as avatars. The degree of interaction between the avatars and the simulated environment is implemented by one or more computer applications that govern such interactions as simulated physics, exchange of information between users, and the like.

The nature of interactions among users of the virtual world is often limited by the constraints of the system implementing the virtual world.

It is within this context that embodiments of the invention arise.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

According to an embodiment of the present invention users may interact with a virtual world. As used herein the term virtual world means a representation of a real or fictitious environment having rules of interaction simulated by means of one or more processors that a real user may perceive via one or more display devices and/or may interact with via one or more user interfaces. As used herein, the term user interface refers to a real device by which a user may send inputs to or receive outputs from the virtual world. The virtual world may be simulated by one or more processor modules. Multiple processor modules may be linked together via a network. The user may interact with the virtual world via a user interface device that can communicate with the processor modules and other user interface devices via a network. Certain aspects of the virtual world may be presented to the user in graphical form on a graphical display such as a computer monitor, television monitor or similar display. Certain other aspects of the virtual world may be presented to the user in audible form on a speaker, which may be associated with the graphical display.

Figure 1A:
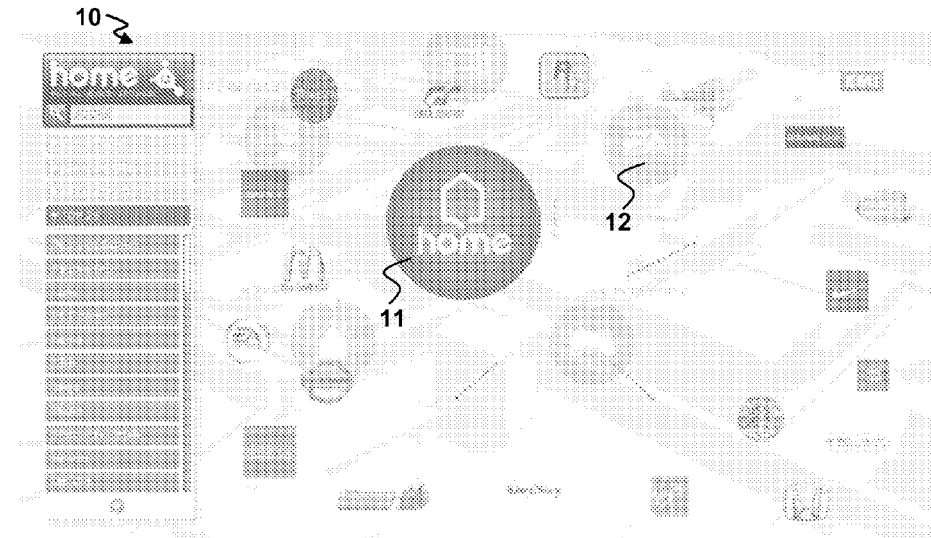
FIG. 1A is a screen shot illustrating an example of a world map representing a virtual world that may be used in conjunction with embodiments of the present invention.

By way of example, the virtual world may comprise a simulated public space and one or more simulated private spaces. In some embodiments, such public and private spaces may be presented to the user via a graphic display that presents a schematic representation or map of the virtual world. By way of example, as shown in FIG. 1A, a world map 10 may indicate a "home" location 11. The home location 11 may be a private space within the virtual world that is exclusive to a particular user. Other users may "visit" the home location 11 only at the invitation of the user associated with that location. The world map 10 may also show various other locations 12 that the user may visit, e.g., by selecting them with a cursor or similar graphical user interface. These locations may be sponsored by vendors and may be represented on the map by their respective corporate logos or other well-recognized symbols. Such locations may be visited by an user of the virtual world. The virtual world may or may not have a fixed amount of virtual "real estate". In preferred embodiments, the amount of virtual real estate is not fixed.

Figure 1B:
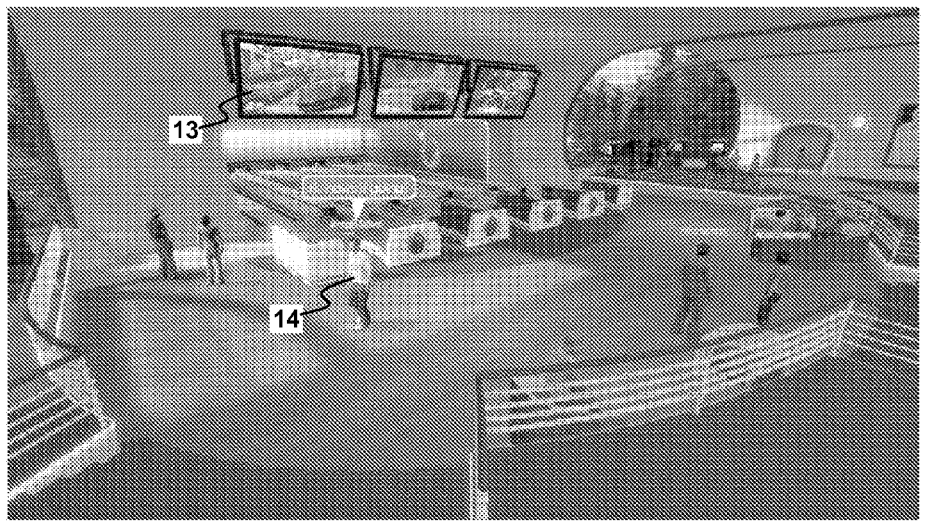
FIG. 1B is a screen shot illustrating an example of a public space in a virtual world that may be used in conjunction with embodiments of the present invention.

In certain embodiments of the present invention, the virtual world may have multiple public spaces referred to herein as "lobbies". Each lobby may have associated with it a separate chat channel so that users in the lobby may interact with one another. Each lobby may have the appearance of a lobby for a public building such as a hotel, office building, apartment building, theater or other public building. FIG. 1B depicts a screen shot of such a lobby. The lobby may contain items with which users may interact. Examples of such items include games. As may be seen from FIG. 1B, portions of the virtual world may be presented graphically to the user in three-dimensional (3D) form. As used herein, the term three-dimensional (3D) form refers to a representation having the dimensions of length, width and depth (or at least the illusion of depth). The lobby may contain "screens" 13, which are areas in spaces that can be used to show photos or canned or streaming video.

Within the virtual world, users may be represented by avatars 14. Each avatar within the virtual world may be uniquely associated with a different user. The name or pseudonym of a user may be displayed next to the avatar so that users may readily identify each other. A particular user's interactions with the virtual world may be represented by one or more corresponding actions of the avatar. Different users may interact with each other in the public space via their avatars. An avatar representing a user could have an appearance similar to that of a person, an animal or an object. An avatar in the form of a person may have the same gender as the user or a different gender. The avatar may be shown on the display so that the user can see the avatar along with other objects in the virtual world. Alternatively, the display may show the world from the point of view of the avatar without showing itself. The user's (or avatar's) perspective on the virtual world may be thought of as being the view of a virtual camera. As used herein, a virtual camera refers to a point of view within the virtual world that may be used for rendering two-dimensional images of a 3D scene within the virtual world. Users may interact with each other through their avatars by means of the chat channels associated with each lobby. Users may enter text for chat with other users via their user interface. The text may then appear over or next to the user's avatar, e.g., in the form of comic-book style dialogue bubbles, sometimes referred to as chat bubbles. Such chat may be facilitated by the use of a canned phrase chat system sometimes referred to as quick chat. With quick chat, a user may select one or more chat phrases from a menu.

Figure 1C:
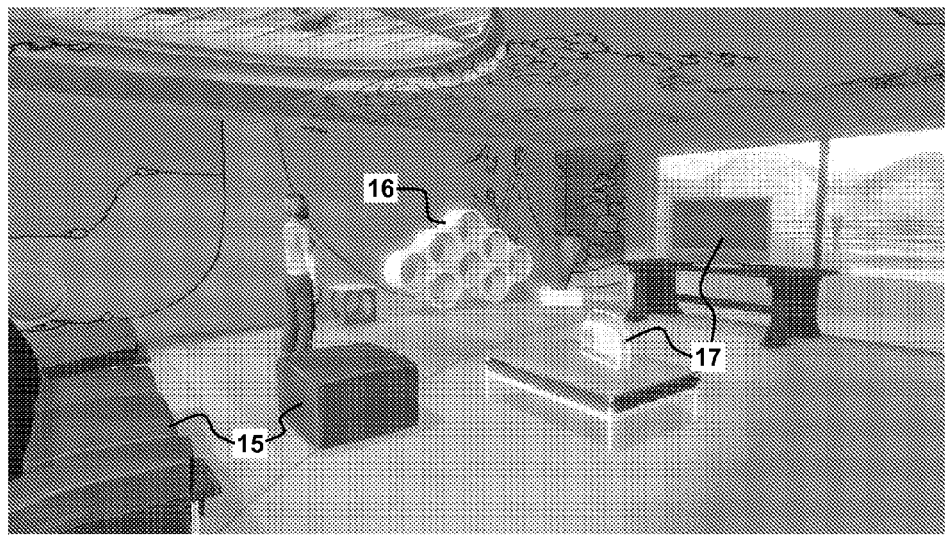
FIG. 1C is a screen shot illustrating an example of a private space in a virtual world that may be used in conjunction with embodiments of the present invention.

In embodiments of the present invention, the public spaces are public in the sense that they are not uniquely associated with any particular user or group of users and no user or group of users can exclude another user from the public space. Each private space, by contrast, is associated with a particular user from among a plurality of users. A private space is private in the sense that the particular user associated with the private space may restrict access to the private space by other users. The private spaces may take on the appearance of familiar private real estate. For example, as seen in FIG. 1C a private space may be configured to resemble an apartment or private home. Virtual items may be included within the private space. Examples of virtual items include, but are not limited to, furniture 15, decorations 16 and virtual communication devices 17, such as a virtual radio or video screen.

Figure 1D:
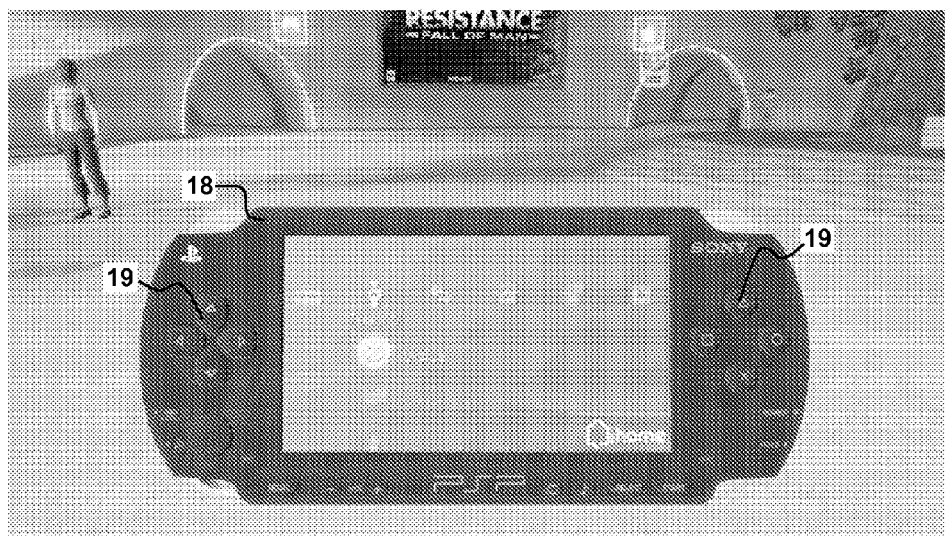
FIG. 1D is a screen shot illustrating an example of a virtual communication device according to an embodiment of the present invention.

In certain embodiments of the present invention, users of the virtual world, users may communicate by means of virtual communication devices. As used herein, the term virtual communication device generally refers to a virtual world simulation of a real world device using assets of the system that generates the virtual world. By way of example, as shown in FIG. 1D, a virtual communication device 18 may be presented on a display in a form that facilitates operation of the device by the user. In the example depicted in FIG. 1D, for instance, the virtual communication device has the appearance of a portable game console, e.g., a Sony Playstation Portable (PSP). Buttons on a real controller that the user uses to interact with the virtual world may be mapped to corresponding buttons 19 or other controls on the virtual communication device to facilitate interaction between the user and the virtual communication device.

A virtual communication device may have associated with it a position within the virtual world that may be fixed or movable. The communication device may be simulated by simulating an interface for the simulated communication device in the virtual world and presenting the simulated interface to a user for interaction therewith. By way of example, the virtual device may have a form or appearance in the virtual world by which it can be recognized by a user. This form or appearance may be configured to mimic that of a corresponding real world device in a way that facilitates user interaction. For example, a virtual phone may be shown as having buttons which the user may operate by using the controller. The virtual phone may further be shown as having a speaker, a mouthpiece and perhaps a graphic display screen. The simulated communication device may be a simulated hand-held communication device, such as a telephone, mobile telephone (e.g., cell phone or cordless phone), voice-over-internet-protocol (VoIP) phone, portable text message device, portable email device, portable game device, two-way radio or other hand-held device.

According to an embodiment of the present invention a virtual communication device may be simulated in the virtual world and communication may take place between the simulated communication device and a real communication device. The real communication device may be a real hand-held communication device, such as a telephone, mobile telephone (e.g., cell phone or cordless phone), voice-over-internet protocol (VoIP) phone, portable text message device, portable email device, portable game device, two-way radio or other hand-held device. Preferably, the real communication device is configured to communicate with other real communication devices via one or more communication channels that are independent of the virtual world. As used herein, the term "communication channel independent of the virtual world" means a channel of communication that does not require the existence of the virtual world in order for communication to take place over that channel. For example, a virtual telephone may be used to make a telephone call to a real cellular phone (or vice versa) via communication assets provided by the virtual world. The real cellular phone, however, could still make calls to other real cellular phones or telephones even if the virtual world did not exist. In some embodiments, the real phone may produce a distinctive ringtone when receiving calls from a virtual phone. In alternative embodiments, the simulated and real communication devices may communicate with each other by means of text messages and/or video images.

Figure 1E:
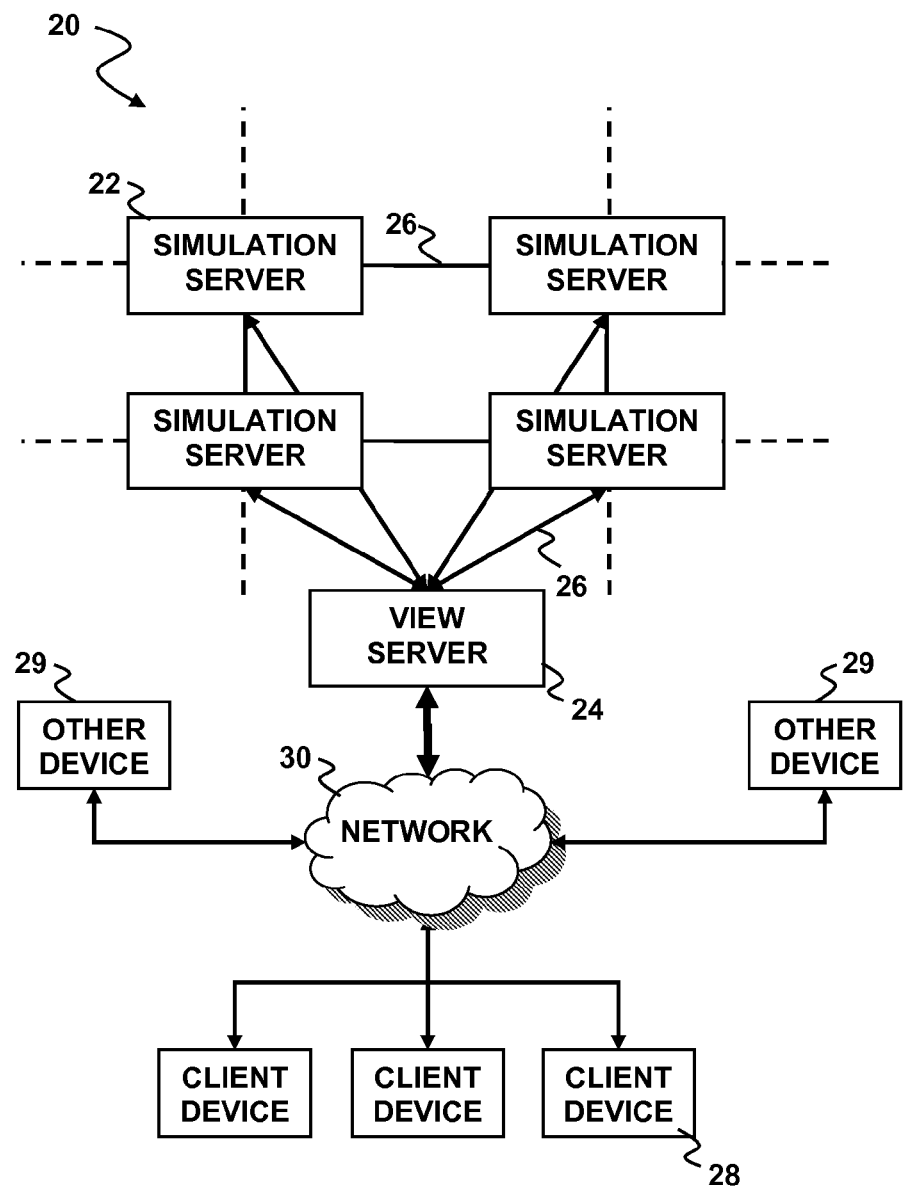
FIG. 1E is a schematic diagram of a virtual world system according to an embodiment of the present invention.

FIG. 1E is a block diagram illustrating an example of system 20 that may be used to simulate a virtual world. The system 20 includes simulation servers 22 and view servers 24. Each simulation server 22 may include one or more processor modules that executes coded instructions that simulate some part of the virtual world. By way of example, each simulation server may include one or more multiple core processors, e.g., a dual-core, quad-core or Cell processors. Although a limited number of simulation servers 22 and a single view server 24 are depicted in FIG. 1E, this configuration may be arbitrarily extended to any number of servers. The numbers of simulation servers 22 and view servers 24 may both be scaled. For example one simulator server 22 may accommodate and many view servers 24, or many simulation servers 22 may accommodate one view server 24. Adding more simulation servers 24 may allow for a bigger and/or better simulation of the virtual world. Adding more view servers 24 allow the system 20 to handle more users. Of course, the system 20 may accommodate both a bigger and better simulation and more users by adding more of both simulation servers 22 and view servers 24. Theoretically the number of simulation servers 22 may be infinitely scalable. However, given a finite level of network bandwidth, the number of view servers 24 may be reasonably expected to reach a finite limit after a certain number of users due to computation and network bandwidth limitations.

For the purpose of example and without limitation of embodiments of the invention, examples will be described herein with respect to Cell processors. Cell processors are described in detail, e.g., in *Cell Broadband Engine Architecture*, copyright International Business Machines Corporation, Sony Computer Entertainment Incorporated, Toshiba Corporation Aug. 8, 2005 a copy of which may be downloaded at http://cell.scei.co.jp/, the entire contents of which are incorporated herein by reference. A typical Cell processor has a power processor unit (PPU) and up to 8 additional processors referred to as synergistic processing units (SPU). Each SPU is typically a single chip or part of a single chip containing a main processor and a co-processor. All of the SPUs and the PPU can access a main memory, e.g., through a memory flow controller (MFC). The SPUs can perform parallel processing of operations in conjunction with a program running on the main processor. The SPUs have small local memories (typically about 256 kilobytes) that must be managed by software—code and data must be manually transferred to/from the local SPU memories. For high performance, this code and data must be managed from SPU software (PPU software involvement must be minimized). There are many techniques for managing code and data from the SPU. Examples of such techniques are described e.g., in U.S. patent application Ser. No. 11/238,077 to John P. Bates, Payton White and Attila Vass entitled "CELL PROCESSOR APPARATUS AND METHODS, filed Sep. 27, 2005, U.S. patent application Ser. No. 11/238,095 to Richard B. Stenson and John P. Bates entitled "CELL PROCESSOR TASK AND DATA MANAGEMENT" filed Sep. 27, 2005, U.S. patent application Ser. No. 11/238,086 to Tatsuya Iwamoto entitled "CELL PROCESSOR TASK AND DATA MANAGEMENT" filed Sep. 27, 2005, U.S. patent application Ser. No. 11/238,087 to John P. Bates, Payton R. White, Richard B. Stenson, Howard Berkey, Attila Vass, Mark Cerny and John Morgan entitled SPU TASK MANAGER FOR CELL PROCESSOR filed Sep. 27, 2005, U.S. patent application Ser. No. 11/257,761 to Tatsuya Iwamoto entitled "SECURE OPERATION OF CELL PROCESSORS" filed Oct. 24, 2005, U.S. patent application Ser. No. 11/461,390 to John P. Bates, Keisuke Inoue and Mark Cerny entitled CELL PROCESSOR METHODS AND APPARATUS, filed Jul. 31, 2006, the entire contents of all of which are incorporated herein by reference. The simulation servers 22 may communicate with each other and with the view servers 24 via high speed data transfer links 26. By way of example, the data transfer links may be 10 gigabit per second Ethernet connections. The simulation servers 22 may be either remotely located with respect to each other or they may be located proximate each other. To optimize data transfer it may be desirable to locate the simulation servers 22 in fairly close physical proximity, e.g., within the same room or on the same server rack. The view servers 24 receive simulation data from the simulation servers 22 and send view data to remotely distributed client devices 28 over a wide area network 30, such as the Internet or other wide area network. The client devices 28 may be any suitable device that can communicate over the network 30. Communication over the network 30 may be slower than over the fast data links 26.

By way of example, the client devices 28 may be video game console devices, such as the Sony PlayStation 3. Alternatively, the client devices 28 may be any computer device from handheld to workstation, etc. A handheld video game device, such as a PlayStation Portable from Sony Computer Entertainment of Tokyo, Japan is one example among others of a handheld device that may be used as a client device 28 in embodiments of the present invention. The client devices 28 may send the view servers 24 instructions relating to their desired interaction with other clients' avatars and with the simulated environment. For example, a client user may wish to move his or her avatar to a different portion of the simulated environment. Each client device 28 sends instructions to one of the view servers 24. These instructions are relayed by the view servers to the simulation servers that perform the necessary computations to simulate the interactions.

Other devices 29 may also communicate with each other over the network 30. Examples of such other devices include, telephones, cellular phones, voice over internet protocol (VoIP) phones, personal computers, portable web browsers, portable email devices, text messaging devices, portable game devices and the like. Communication between such other devices 29 may be independent of the simulation servers 22 and view servers 26 that generate the virtual world. Although the other devices 29 are not considered part of the system 20, they may interact with it via the network 30.

The users of the client devices 28 are often interested in things around them. The view servers 24 make sure that each client 28 receives relevant data about its surroundings in the proper order. The view servers 24 determine what the client needs based on its avatar's location, orientation, motion, etc. By way of example, each view server may generate the code and/or data that the client devices use to present views of the public spaces or private spaces.

To implement a complex simulated world, it may be desirable to establish peer-to-peer communication between clients and servers or between client devices and other client devices. For example, audio/video (A/V) chat among users in the same public space may be implemented by direct peer-to-peer communication among the users. Such peer-to-peer communication may reduce the load on the servers. Embodiments of the invention may make use of Peerlib to traverse network address translators (NATs) to establish peer-to-peer connections among users in the same public space. NAT traversal is described e.g., in U.S. patent application Ser. No. 11/245,853 to Yutaka Takeda, entitled "METHOD FOR PEER-TO-PEER COMMUNICATION TRAVERSING NETWORK ADDRESS TRANSLATORS OF TYPE SYMMETRIC" filed Oct. 4, 2005, which is incorporated herein by reference.

Figure 1F:
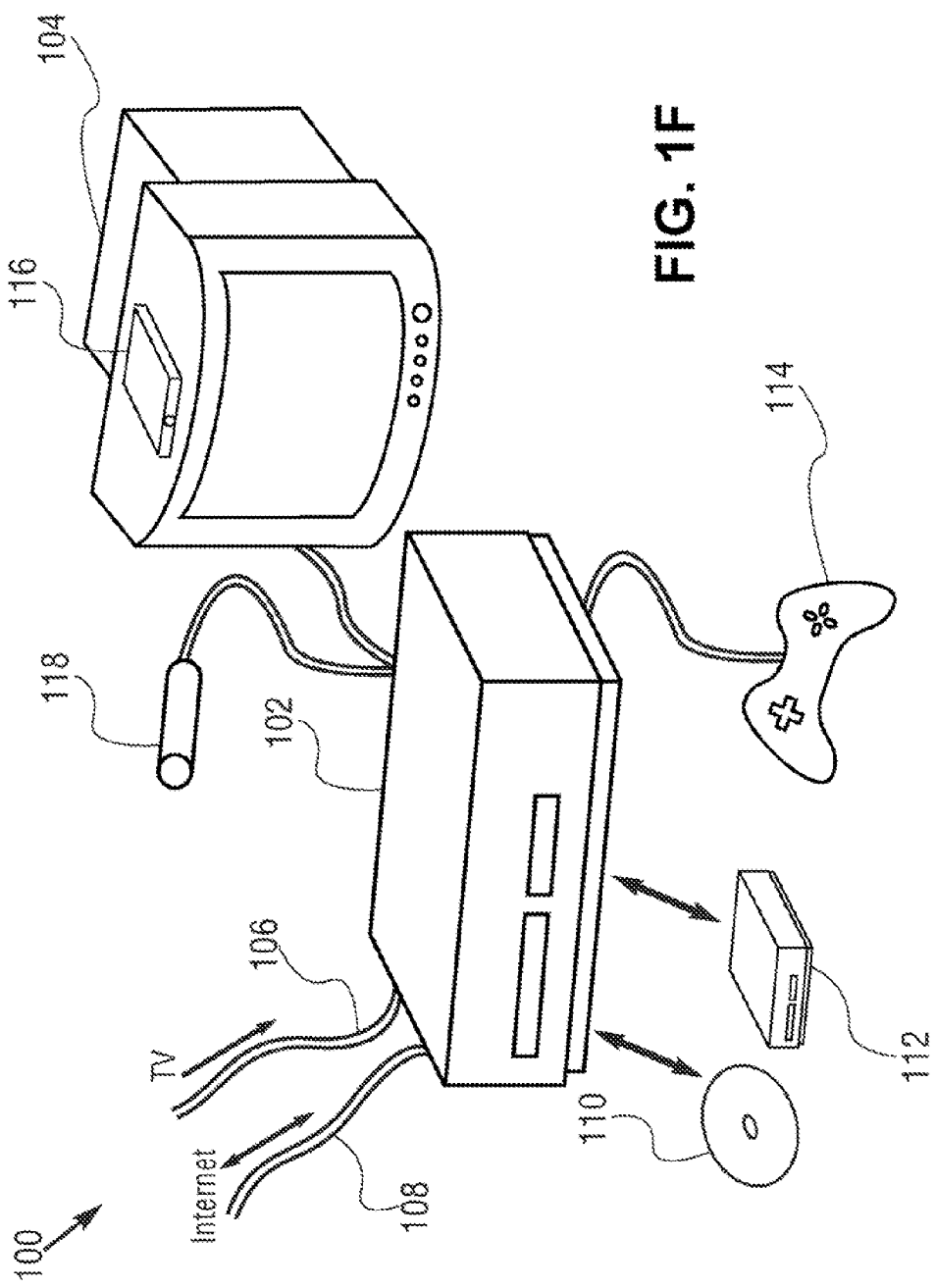
FIG. 1F is a functional block diagram showing one implementation of a multimedia processing apparatus by which a user may perceive and interact with a virtual world according to an embodiment of the present invention.

FIG. 1F shows one implementation of a multimedia processing system 100 that may be used as a client device 28 and a user interface with the virtual world generated by the system 20. The processing system 100 may include a composite apparatus capable of processing a plurality of contents, such as still images, moving images, music, broadcasts, and games, spread over a plurality of media. The processing of a plurality of contents includes presentation, recording, and other related tasks performed by the multimedia processing system 100. By way of example, the multimedia processing system 100 includes a multimedia processing apparatus 102, a display 104 (e.g., a monitor or television), and a controller 114. Buttons on the controller 114 may be mapped to corresponding buttons 19 on the virtual controller 18 shown in FIG. 1D and described above.

The multimedia processing apparatus 102 may receive multimedia contents from various media sources, such as broadcast media, the Internet (or other network) media, an optical disk 110, and a memory card 112. Contents from the broadcast media may be received through a broadcast data channel 106, while contents from the Internet media can be received through a network data channel 108. The broadcast and network data channels 106, 108 may be either wireless or wired channels. The contents from the broadcast media and the Internet media can be recorded and stored by the multimedia processing apparatus 102. The received contents can also be used by various functions (e.g., a game) of the multimedia processing apparatus 102 in addition to interaction with the virtual world.

The received multimedia contents may be displayed on the display 104. The display may include a video monitor, such as a cathode ray tube (CRT) or flat screen for display of still or moving visual images. The display 104 may further include one or more audio speakers for presenting sounds to the user. The controller 114 allows the user to input various instructions related to multimedia processing, and to control functions of the multimedia processing apparatus 102.

The system 100 may include audio and video inputs to facilitate user interaction with visual images and/or audible sounds presented by the display 104. Such inputs may include a video image capture device 116, such as a camera, and an audio signal capture device 118, such as a microphone. The video image capture device 116 may be placed on top of or integrated into the display 104 and coupled to the multimedia processing apparatus 102, e.g., by cables, or over-the-air connections, such as optical (e.g., infrared) or radiofrequency (e.g., Bluetooth) data links. It should be understood that the image capture device 116 may be placed in any other proximate location that will allow it to capture images that are located about in front of the display 104. Techniques for capturing these movements and interactions can vary, but examples of such techniques are described in United Kingdom Applications GB 0304024.3 (PCT/GB2004/000693) and GB 0304022.7 (PCT/GB2004/000703), each filed on Feb. 21, 2003, and each of which is hereby incorporated by reference. The image capture device 116 may be a digital camera, e.g. a USB 2.0 type camera. Such a camera may have a field of view of about 75 degrees, and an f-stop of about 1.5 and be capable of capturing images at a frame rate of up to about 120 frames per second. By way of example, the video image capture device may be an EyeToy Camera available from Logitech of Fremont, Calif. The media processing apparatus 102 may be a game console, television, digital video recorder (DVR), cable set-top-box, home media server or consumer electronic device and including any device capable of rendering itself subject to control of a user. In alternative embodiments, the image capture device may be a three-dimensional (3D) camera. As used herein, a 3D camera (or zed camera) refers to an image capture device configured to facilitate determining the depth of objects in an image. In this context, the term "depth" refers a location of an object relative to a direction perpendicular to a plane of the image.

Figure 2A:
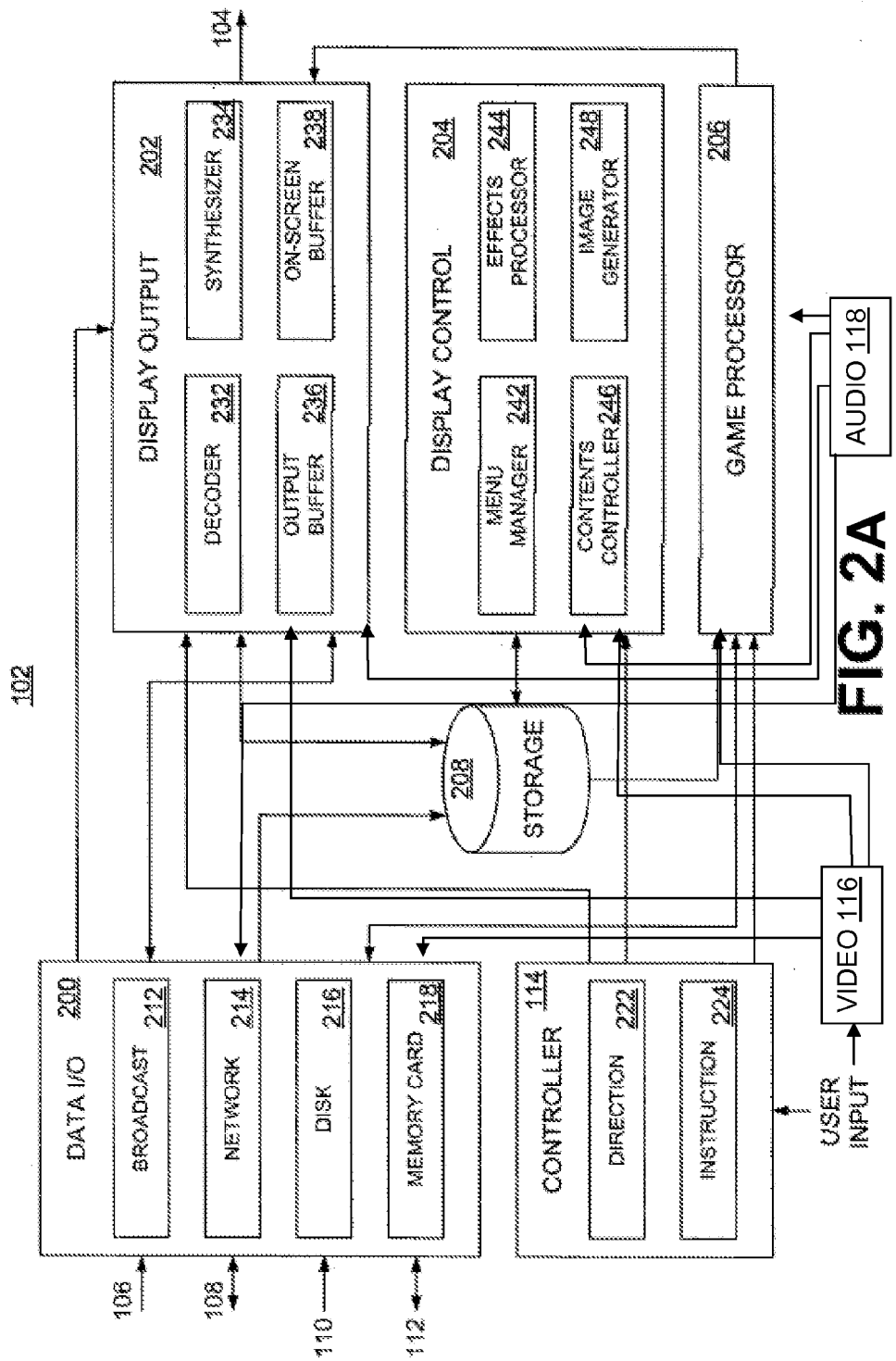
FIG. 2A is a functional block diagram showing one implementation of the multimedia processing apparatus that may be used in conjunction with embodiments of the invention.

FIG. 2A is a functional block diagram showing one implementation of the multimedia processing apparatus 102. In the illustrated implementation, the multimedia processing apparatus 102 includes the controller 114, video image capture device 116, audio signal capture device 118, a data input/output (I/O) unit 200, a display output unit 202, a display control unit 204, a storage unit 208, and a game/virtual world processor 206. By way of example, the game/virtual world processor 206 may be or may include a parallel processor such as a cell processor having a power processing unit (PPU) coupled to one or more synergistic processing units (SPU). Cell processors are described, e.g., in U.S. patent application Ser. No. 11/238,077, which is incorporated herein by reference. The multimedia processing apparatus 102 further includes programs and instructions for performing various functions, such as a data input function, a data retaining function, an image processing function, a rendering function, and other related functions.

The controller 114 may include a direction-determining unit 222 for determining one or a combination of four directions (i.e., an upward direction, a downward direction, a left direction, and a right direction) from the user input; and an instruction-determining unit 224 for determining an instruction from the user input. The instruction may include a command to present a multimedia content, to terminate the presentation, to invoke a menu screen, and to issue other related commands and/or instructions. Output of the controller 114, video image capture device 116 and audio signal capture device 118 is directed to the display output unit 202, the display control unit 204, and the game/virtual world processor 206.

In the illustrated implementations of FIGS. 1B and 2A, the direction-determining unit 222 and the instruction-determining unit 224 may be configured with a combination of buttons, circuits, and programs to actuate, sense, and determine the direction and the instruction. The buttons can include cross-shaped keys or joysticks. The button associated with an instruction for invoking a menu screen can be set in a toggle manner so that the menu screen can be toggled between a display mode and a non-display mode each time the button is pressed.

In one implementation, the direction-determining unit 222 may determine the diagonal movements of the button as a binary command in which the movement is ascertained to be in one of two directions. Thus, a diagonal movement between the up direction and the right direction can be ascertained to be in either the up or the right direction. In another implementation, the direction-determining unit 222 may determine the diagonal movements of the button as an analog command in which the movement is ascertained to be in a particular direction up to the accuracy of the measurement. Thus, a diagonal movement between the up direction and the right direction can be ascertained to be in a northwesterly direction. Directional movements may also be determined through interaction between the user, the video image capture device 116 and the display control 204 as described below.

The data I/O unit 200 may include a broadcast input unit 212 for inputting broadcast contents via the broadcast channel 106; a network communication unit 214 for inputting and outputting data such as web contents via the network channel 108; a disk reading unit 216 for inputting data stored on a disk 110; and a memory card reading unit 218 for inputting and outputting data to/from a memory card 112. Output of the data I/O unit 200 may be directed to the display output unit 202, the display control unit 204, the game processor 206, and the storage unit 208.

The display output unit 202 may include a decoder 232, a synthesizer 234, an output buffer 236, and an on-screen buffer 238. The decoder 232 decodes input data received from the data I/O unit 200 or the storage unit 208. Thus, the input data may include broadcast contents, movies, and music. The synthesizer 234 processes the decoded input data based on user direction/instruction received from the controller 114. The output of the synthesizer 234 is stored in the output buffer 236. The on-screen buffer 238 may store image data of a menu screen generated by the display control unit 204. The output of the display output unit 202 is transmitted to the display 104.

The display control unit 204 may include a menu manager 242, an effects processor 244, a contents controller 246, and an image generator 248. The menu manager 242 manages media items and multimedia contents received from the storage unit 208 and the data I/O unit 200, and shown on the menu screen. The effects processor 244 processes operation of icons and icon arrays on the menu screen. The effects processor 244 also manages various actions and effects to be displayed on the menu screen. The contents controller 246 controls processing of media items and multimedia contents, and handling of data from the data I/O unit, the storage unit 208, and the game/virtual world processor 206. The image generator 248 operates to generate a menu screen including a medium icon array and a contents icon array. The game/virtual world processor 206 executes game and/or virtual world programs using data read from the data I/O unit 200 or from the storage unit 208. The game/virtual world processor 206 executes a game program or facilitates user interaction with the virtual world based on user instructions received from the controller 114. The display data of the executed game program or virtual world interaction is transmitted to the display output unit 202.

Figure 2B:
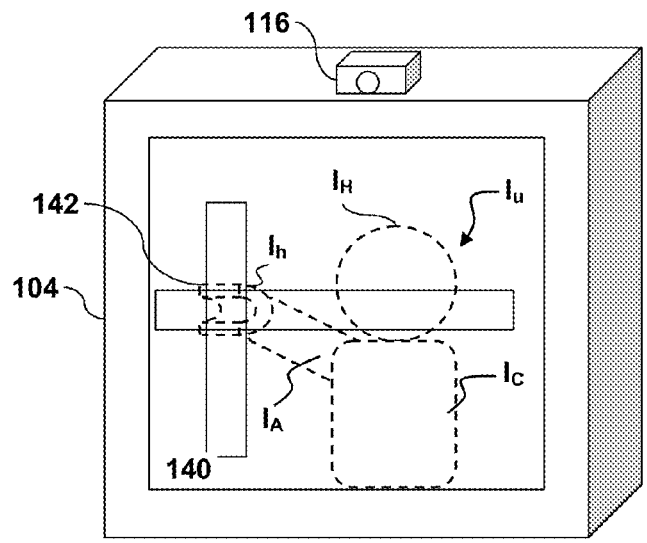
FIG. 2B shows an implementation of a multimedia processing system that may be used in conjunction with embodiments of the invention.
Figure 2B:
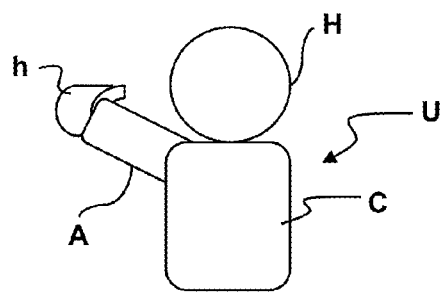

In embodiments of the present invention, signals from the video image capture device 116 and audio signal capture device 118 allow a user to interact with and manipulate images shown on the display 104. Specifically, embodiments of the invention may allow a user to "grab" and "drag" objects from one location to another on the display 104. As shown in FIG. 2B, the video image capture device 116 points at and captures an image $I_U$ of a user U. The image $I_U$ may then be shown on the display 104 in the background of other images through a technique known as alpha blending.

The term "alpha blending" refers generally to a convex combination of two colors allowing for transparency effects in computer graphics. The value alpha in the color code may range from 0.0 to 1.0, where 0.0 represents a fully transparent color, and 1.0 represents a fully opaque color. By way of example, the value of the resulting color when color Value1 is drawn over a background of color Value0 may be given by:

Value=Value0(1.0−alpha)+Value1(alpha)

The alpha component is used to blend to red, green and blue components equally, as in 32-bit RGBA, or, alternatively, there are three alpha values specified corresponding to each of the primary colors for spectral color filtering.

Once the user's hand h is recognized, the effects processor may correlate the directional displacement of the user's hand to directional input such as would normally be received from the controller 114. Optionally a magnitude of the displacement can control the input speed.

In particular embodiments, the image $I_U$ may include the user's head H and hand h. It is noted that to facilitate user interaction with the image $I_U$ the user's image $I_U$ may be presented on the screen as a mirror image of the user U. Thus, when the user U moves his hand h to the user's left, an image $I_h$ of the hand also moves to the user's left. The effects processor 244 may be configured to recognize the user's hand h and recognizes changes in the aspect ratio (ratio of height to width) of the hand image $I_h$. These changes in aspect ratio may be used to signal the controller 114 that the user has "grabbed" or "clicked" on an object 140 presented on the display. The effects processor 244 can then move the selected object with the motion of the image $I_h$ of the user's hand h. In some embodiments, the user may hold a deformable "C"-shaped object 142 that is colored to be more readily recognizable to the effects processor 244 when interpreting the image from the video image capture device 116. Deformation of the object 142, referred to herein as a "clam" can provide a change in aspect ratio that is recognize as a command to "grab" or "click" an object in the display 104.

It is often desirable for the effects processor 244 to be able to recognize whether the user U is using his left or right hand to manipulate the object 140 on the display 104. For example, when manipulating an object on the display 104 with the left hand it is often desirable for object to appear to the left of the user's head H. In such a case the controller may also include software that recognizes the users hand h, head H, his arm A and his chest C by their corresponding images $I_h$, $I_H$, $I_A$, and $I_C$. With this information, the controller 114 can determine whether the user U is using his left or right hand. For example, if the user's hand h is on the left side of his head H and his arm A is not across his chest, it can be determined that the user U is using his left hand. Similarly, if the user's hand h is on the left side of his head and his arm is across his chest, it can be determined that the user U is using his right hand.

Figure 2C:
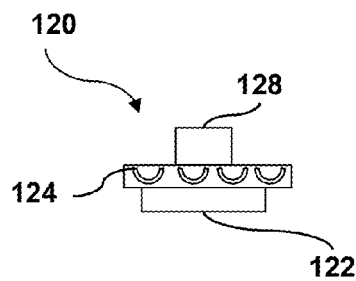
FIGS. 2C-2D illustrate an image capture device including an array of microphones for use with embodiments of the invention.
Figure 2D:
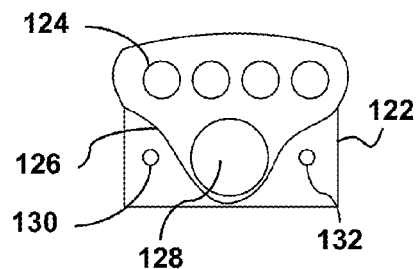

In certain embodiments of the invention the image capture device 116 and audio signal capture device 118 may be combined into the same piece of equipment. For example, FIGS. 2C-2D depict an image capture device 120 that may be used with the multimedia processing system 100. The device 120 includes an optical image capture device 122, e.g., a digital camera (or 3D camera) and one or more microphones 124. The microphones 124 may be arranged in an array and spaced apart from each other at known distances. By way of example and without loss of generality, the microphones 124 may be spaced in a linear array with adjacent microphones spaced about 2 centimeters apart center-to-center. Each microphone may have a resonant frequency of about 16 kilohertz. Such microphone arrays may be used to locate and track one or more sources of sound in conjunction with operation of the apparatus 102 and interaction with a virtual world. The use of such microphone arrays for sound source location and tracking is described, e.g., in U.S. patent application Ser. Nos. 11/381,724, 11/381,725 and 11/381,729 filed May 4, 2006, the entire disclosures of all of which are incorporated herein by reference.

In certain embodiments of the invention it is desirable for the microphones 124 to move with the image capture device 122. For example, the microphones 124 may be mounted to a frame 126 that keeps the microphones in a fixed positional relationship with respect to the image capture device, e.g., with respect to a lens 128. Although the microphones are depicted as being arrayed in a horizontal linear arrangement, they may alternatively be oriented vertically or diagonally or arrayed in a two-dimensional arrangement.

In some embodiments, the device 120 may include a visible LED 130 and an infrared LED 132. These may be used to illuminate objects in a field of view of the image capture device 122. To facilitate capture of infrared images, the lens 128 may include a so-called "day-night" coating that transmits visible light and selected frequencies of the infrared (e.g., frequencies at around 940 nm).

Figure 2E:
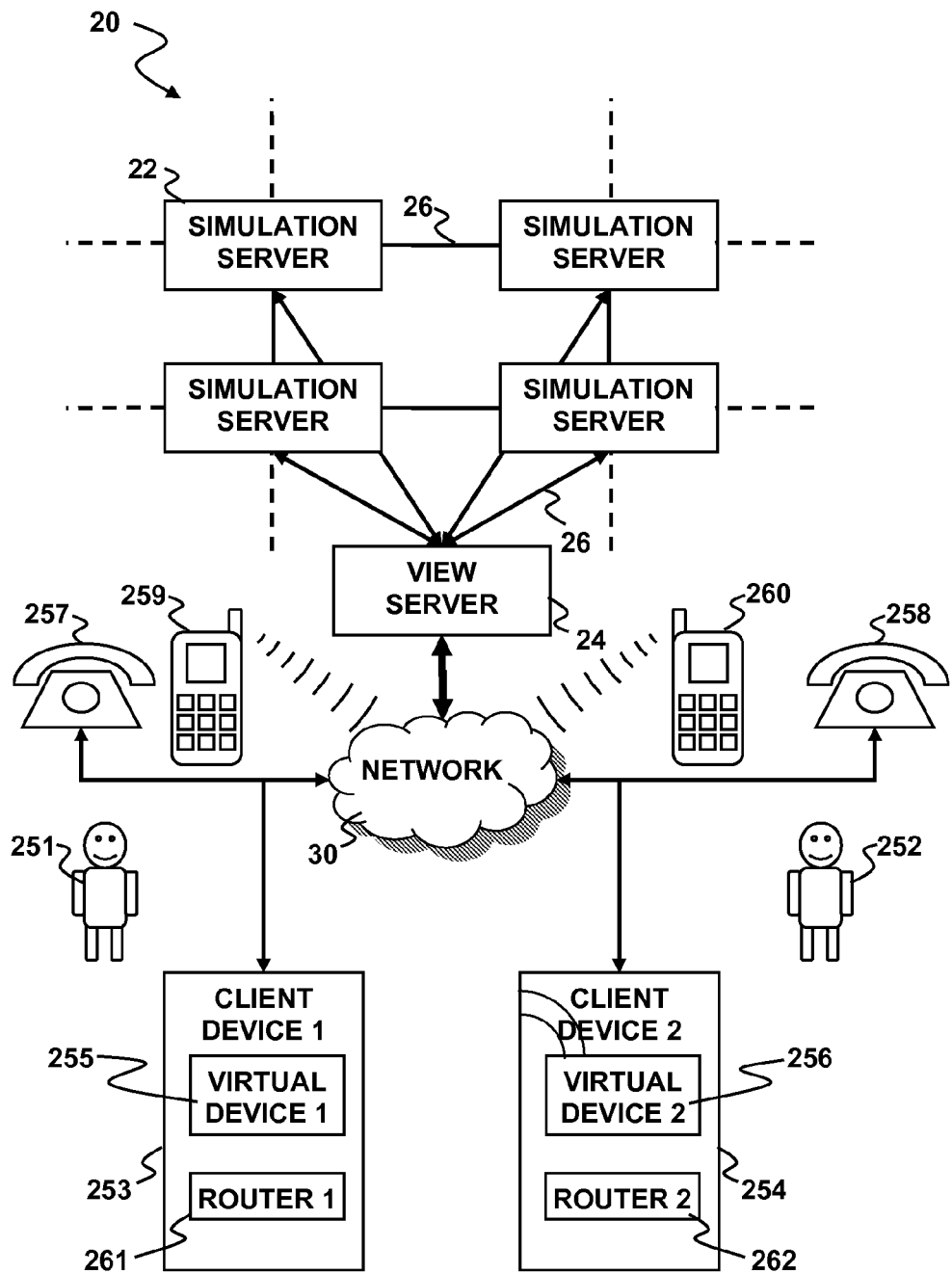
FIG. 2E is a block diagram illustrating examples of call routing between real and virtual communication devices according to an embodiment of the present invention.
Figure 2F:
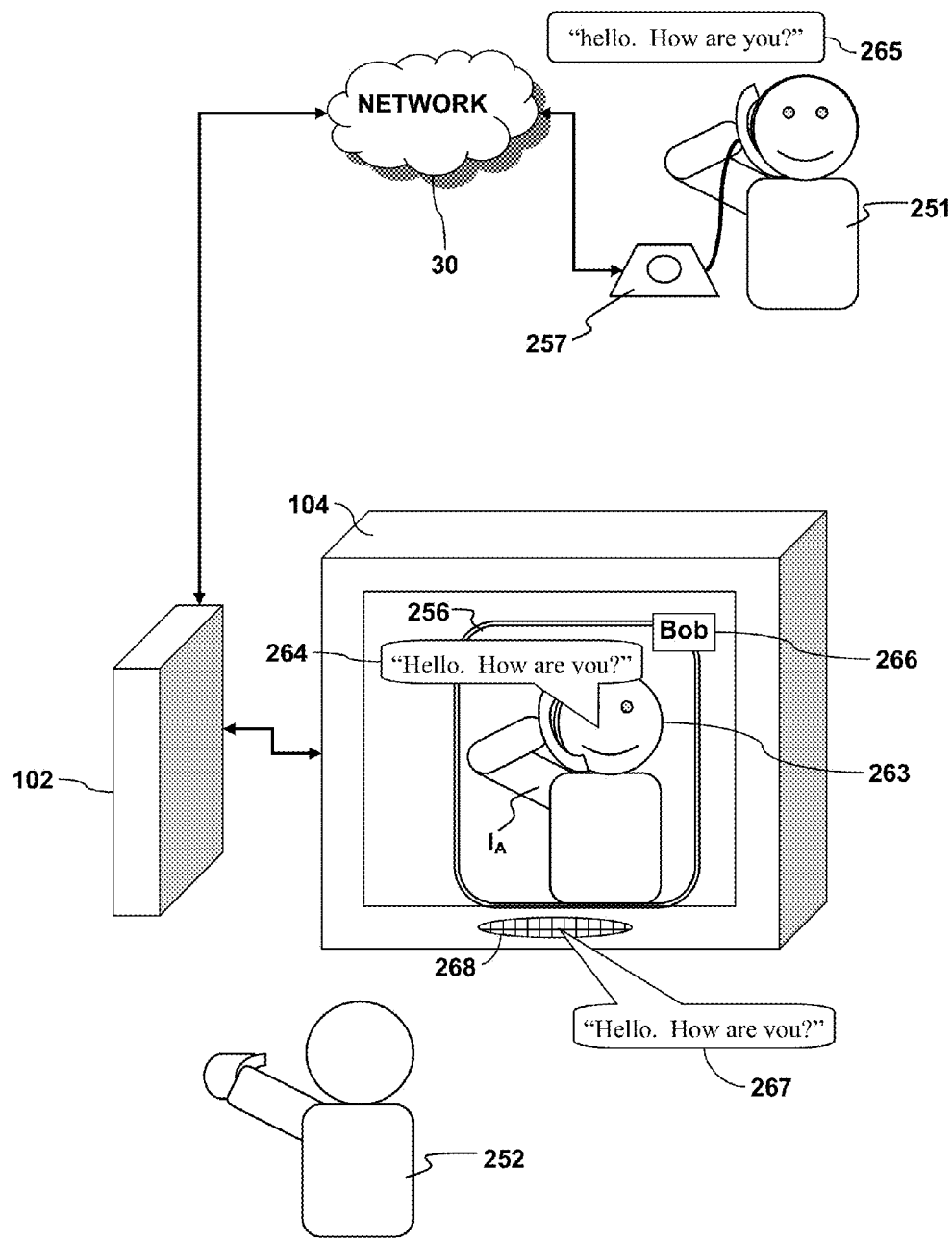
FIG. 2F is diagrammatically illustrates an example of communication between real and virtual communication devices in accordance with an embodiment of the present invention.

By way of example and without loss of generality, communication between real and virtual devices may be understood with respect to FIG. 2E and FIG. 2F. As shown in FIG. 2E, two or more users 251, 252 may interact with a virtual world, e.g., over network 30 via the system 20, described above with respect to FIG. 1E. Each user may interface with the system 20 over the network 30 via client devices 253, 254, which may be suitably configured, e.g., as described above with respect to FIGS. 1F and 2A. Each client device 253, 254 may include suitably configured hardware and/or software that generates a virtual communication devices 255, 256. Device avatars may represent the virtual communication devices in the virtual world. A device avatar may take on the appearance of a real device, e.g., as described above. Alternatively, the user may customize the device avatar so that it takes on an entirely arbitrary and/or fanciful appearance. Each user 251, 252 may also have access to real communication devices, such as land line telephones 257, 258 and cell phones 259, 260. Those of skill in the art will recognize that embodiments of the present invention may be implemented with any number of users and any number of real and/or virtual communication devices.

In such embodiments, elements of the system 20 and apparatus 102 may be used to enable intelligent two-way routing between the virtual world and real communication devices.

By way of example and without loss of generality, communication between real and virtual devices may be understood with respect to FIG. 2E and FIG. 2F. As shown in FIG. 2E, two or more users 251, 252 may interact with a virtual world, e.g., over network 30 via the system 20, described above with respect to FIG. 1E. Each user may interface with the system 20 over the network 30 via client devices 253, 254, which may be suitably configured, e.g., as described above with respect to FIGS. 1F and 2A. Each client device 253, 254 may include suitably configured hardware and/or software that generates a virtual communication devices 255, 256. Device avatars may represent the virtual communication devices in the virtual world. A device avatar may take on the appearance of a real device, e.g., as described above. Alternatively, the user may customize the device avatar so that it takes on an entirely arbitrary and/or fanciful appearance. The Each user 251, 252 may also have access to real communication devices, such as land line telephones 257, 258 and cell phones 259, 260. Those of skill in the art will recognize that embodiments of the present invention may be implemented with any number of users and any number of real and/or virtual communication devices.

Each client device 253, 254 may be provided with a configurable router 261, 262 to facilitate routing of calls among real devices and virtual devices. The routers 261, 262 may reside in software or hardware, on a server, peer-to-peer network, combination, etc. In the example depicted in FIG. 2E, the routers 261, 262 are located on the client devices 253, 254, however this is not the only possible configuration. The routers 261, 262 may alternatively be located anywhere, e.g., on the simulation servers 22, view servers 24 or other devices connected to the network 30. The routers 261, 262 may be accessed in a plurality of ways and from various devices, including, but not limited to, the virtual phone or communication device, real communication device, network web pages, and the like. Each router 261, 262 may be configured with one or more routing preferences to control the routing function. The routers 261, 262 may implement routing preferences for either the source or the target of a communication. As used in the context of this embodiment, the "source" of a communication generally refers to the party originating a communication (e.g., the "caller" for telephone call or the "sender" for text message or email). As used in the context of this embodiment, the "target" of a communication generally refers to the intended recipient of the communication. It is noted that the source or target need not be a user of the virtual world.

By way of example, suppose a first user 251 wishes to communicate with a second user 252, e.g., using virtual communication device 255. In this case, the first user 251 is the source of the call and the second user 252 is the target of the call. The first user's router 261 may be configured to preferentially attempt to contact the second user 252 at virtual communication device 256. If the user is not online and using the virtual world, the first user's router 261 may attempt to contact the second user at land line 258 and failing that, the router 261 may attempt to contact the second user 252 at his or her cell phone 260. As an alternative example, it is noted that the second user's router 262 may implement its own routing preference for reception of communications from the first user 251. For example, the second user's router 262 may preferentially route calls from the first user 251 to the second user's cell phone 260, then to the second user's land line 258 and then to the second user's virtual device 256.

In a preferred embodiment each user 251, 252 may have one corresponding telephone number that is associated with each of that user's real and virtual communication devices. The routers 261, 262 may route calls to a particular user's number among the user's different devices automatically. Such routing may be based on the user's preferences, the user's activity, or some combination of both. It is noted that the routers 261, 262 may be programmed with different preferences depending on the identity of the source of the communication and/or on the identity of the target of the communication.

For example, in one mode the first user's router 261 may receive a call from a source who is calling a first user's number. In one mode, the first user 251 may provide the router 261 with information indicating that the first user 251 is online. Such information may be programmed into the multimedia processing apparatus 102, e.g., using the controller 114. Alternatively, the router 261 may check to see if the first user 251 is online. If so, the router 261 may route the "call" to the first user's virtual communication device 255, which may be configured "ring" even if the first user 251 is online via the second user's client device 254.

In another mode, the router 261 may be provided with information or may check to determine that the first user 251 is online and the target (e.g., the second user 252) is offline. In such a case, the first user's router 261 may route the "call" to the second user's real communication device, e.g., land line 258 or cell phone 260.

In another mode, the first user's router 261 may be provided information or determine that the first user 251 is online and the second user 252 is online. In such a case, a "text message" may be routed within the virtual world, e.g., to the second user's avatar OR the target second user's virtual device 256.

In another mode, the router 261 may be provided information or may check to determine if the second user 252 is online. If the second user 252 is offline the "text message" may be routed to a real world device associated with the second user, e.g., land line 258 or cell phone 260.

Many other permutations on the above examples are also possible. For example, in the above examples the source may place the call from within the virtual world OR within the virtual world through an avatar virtual device OR through any VoIP device or service or through any real telephone line and source.

In other configurations the above intelligent routing may take action based on user preferences so a user may want his real cell phone to ring when online not his avatar phone. In other configurations the above intelligent routing may take action based on STATE CONTROLS so only in certain circumstances does the call route to the avatar or the real phone depending on the application configuration. For example, if a target is involved in an online game and does not wish to be interrupted the call may be routed to the target's real or virtual voicemail. In yet another configuration, a call may be routed to virtual device but if the device does not ring instead of going to virtual voicemail call may be re-routed to a real device, such as a real phone.

As shown in FIG. 2F, embodiments of the present invention allow for a situation where the first user 251 calls the second user 252 using a real phone, e.g., land line 257 speaks into the phone and the first user's avatar 263 appears on the second user's virtual communication device 256 which is shown on the display 104 connected to the multimedia processing apparatus 102 belong to the second user 252. The first user's name 266 may also be shown on the display 104 proximate the first user's avatar 263. The first user's spoken speech 265 may be translated to text through use of speech recognition software and/or hardware, which may be implemented on the apparatus 102, the simulation servers 22, view server 24 or other device. The resulting text may appear on the display 104 as text bubbles 264 proximate the first user's avatar 263. An audio speaker 267 may play audible sounds 268 of the first user's speech 265 during communication between the first and second users.

It is noted that the same routing procedure may be used for other types of messaging, e.g. text messaging or email. An advantage of this system is that real calls and/or text messages may be routed from one user to another in a way that can avoid long distance or other phone charges associated with real communication devices. The recipient's (or user's) real telephone or text message device may be equipped with middleware to facilitate interaction with the virtual world supported by the system 20.

In some embodiments, a user may be able to use a real communication device to access virtual world content. For example, a cellular phone, portable internet device, etc. may be used to make changes to the user's avatar, public space or private space. Alternatively, the real communication device may be used to remotely access virtual communication device content. In particular, the real communication device may be used as an interface between the simulated communication device and a user. For example, suppose the virtual communication device is a virtual digital video recorder (DVR) located within the user's private space. A user may access the virtual DVR to record a real or virtual event by way of a real cellular phone and electronic programming guide.

As mentioned above, communicating between the real and virtual communication devices may involve video communication. According to a particular embodiment, an image of the avatar may be displayed with the real communication device during the video communication. The system that generates the virtual world may facilitate lip-synching of the avatar image to real or synthesized speech generated by the user associated with the avatar. For example, the user may record a voice message to be sent to the real device as part of a video message. The system may generate a video message of the avatar speaking the voice message in which the avatar's lip movements are synchronized to the user's speech within the message. Alternatively, the user may enter text of the message into a virtual device. The system may then synthesize speech for the avatar from the text and then generate a video image of the avatar in which the avatar's lip movements are synchronized to the synthesized speech. In other embodiments, the user may record a sound and video message, e.g., using the video image capture device 116 and audio signal capture device 118.

In some embodiments, the avatars 14 may express emotion through animation, facial change, sound, particle or chat bubble change to communicate a specific emotion. Such expressions of emotion by the avatar (sometimes called "emotes") may be pre-programmed and may be triggered by user commands. In particular embodiments of the invention, emotions expressed by the user during interaction with the virtual world may be mapped to emotion exhibited by the user's avatar. In certain embodiments, the user may select an emotional state that can be projected by the avatar. By way of example avatar emotes may be selected from a menu presented to the user by the apparatus 102. If, for example, the user selects "happy", the user's avatar may be shown with a smile on its face. If the user selects "sad", the avatar may be shown with a frown. Such menu-drive emotions may be somewhat awkward for a user to implement quickly. Therefore, in certain embodiments of the apparatus 102 may be configured to detect an emotional state of the user in real time and then appropriately change the features of the user's avatar to reflect that state. Such real time tracking of user emotional state can be particularly useful, e.g., for mapping user emotional state onto an avatar during video communication in which an image of the user's avatar is presented to a real device.

By way of non-limiting example, the apparatus 102 may track user emotional state in real time by capturing one or more visual images of the user U and analyzing one or more facial features of the user using the image capture device 116. The game/virtual world processor 206 may be programmed to analyze these images, e.g., using facial features such as the user's lips, eyes, eyelids and eyebrows, cheeks, teeth or nostrils, or body language features, e.g., stance, placement of arms or hands, to determine the user's emotional state. Such facial and/or body language analysis may be enhanced through the use of a 3D camera to generate the images.

Alternatively, user emotional stage may be tracked in real time through analysis of the user's voice stress as exhibited in user speech or other vocalizations detected by the audio signal capture device 118. Where the user communicates via text, emotional may be tracked by analysis of the text for certain words, phrases or language patterns that are indicative of emotional state. In addition, the user's emotional state may be tracked using other biometrics, such as electrocardiographic (EKG), electroencephalographic (EEG), galvanic skin response, or thermal imaging data. Such data may be obtained through appropriate sensors incorporated into the controller 114 and analyzed by appropriately configured software, hardware, or firmware incorporated into the processor 206. Thermal imaging data may also be obtained if the image capture device 116 includes an infrared imaging capability.

Once the user's emotional state has been determined various combinations of body language and facial features indicative of the emotional state may be reflected in emotes exhibited by animation of the avatar (e.g., a raised fist combined with bared teeth to indicate anger).

In some embodiments, users may wish to use customized gestures or "emotes" for their avatars. To facilitate this one or more custom gestures may be generated for the avatar. These custom gestures may then be associated with one or more user interface signals so that the user's avatar can perform the gesture on command. By way of example, the custom gesture may be generated through use of motion capture or performance capture techniques to record and digitize the user's bodily movements or mapping of the user's facial expression as the user performs the gesture. In some embodiments, the image capture device 116 may be used for this purpose. Alternatively, a commercial motion capture studio or performance capture studio may be used for this purpose.

In motion capture, the user or some other performer may wear markers near each joint to identify the motion by the positions or angles between the markers. Acoustic, inertial, LED, magnetic or reflective markers, or combinations of any of these, are tracked, optimally at least two times the rate of the desired motion, to submillimeter positions. The motion capture computer software records the positions, angles, velocities, accelerations and impulses, providing an accurate digital representation of the motion. By way of example, an optical motion capture system may triangulate the 3D position of a marker between one or more cameras calibrated to provide overlapping projections. A passive optical system may use markers coated with a retroreflective material to reflect light back that is generated near the cameras lens. The cameras sensitivity can be adjusted taking advantage of most cameras narrow range of sensitivity to light so only the bright markers will be sampled ignoring skin and fabric. Alternatively, an active optical system may be used in which the markers themselves are powered to emit their own light. Power may be sequentially provided to each marker may in phase with the capture system providing a unique identification of each marker for a given capture frame at a cost to the resultant frame rate.

Performance capture differs from standard motion capture due to the interactive nature of the performance, capturing the body, the hands and facial expression all at the same time, as opposed to capturing data for reference motion and editing the motions together later.

Once the user's body movements and/or facial expression for the gesture have been digitized, the digitized gesture may be used to generate coded instructions or other user interface signals for animation of the avatar so that it performs the gesture. The code or other user interface signals may be distributed to one or more other users, so that they can customize their avatars to perform the custom gesture. Customized avatar gestures may be combined with customized avatar clothing, footwear, hairstyles, ethnic characteristics and other custom avatar features as a means of social identification with a particular group. In some embodiments it may be desirable to moderate the use of custom gestures, e.g., to avoid unnecessarily offending other users or breaking the law. As used herein moderating or moderation refers to enforcement of some degree of rules for acceptable behavior in the virtual world. Such moderation may be implemented by the view servers 24, which may analyze the custom gestures for rudeness or other indications of inappropriateness. Moderating the display of the custom gesture may include restricting an ability of a particular user to make an avatar perform the custom gesture or an ability of the particular user to perceive the avatar performing the custom gesture based on predetermined criteria. Such predetermined criteria may include the age of the user or viewer of the gesture or a sensitivity of the viewer to offense based on religious, ethnic or other affiliation of the viewer.

The systems and methods described above may be modified to implement communication using a virtual world according to an alternative embodiment of the invention. Specifically, an avatar may be associated with a source of an email. A user may generate an email within the virtual world and associate one or more images of his or her avatar with the email. The email may be sent from the virtual world to a real a real device. The avatar images may be then be presented at email's destination, e.g., by self-extracting email attachment. The email may be generated, e.g., using a virtual communication device within the virtual world. By way of example, and without limitation, the destination of the email may be a real communication device, e.g., any real device configured to receive email messages. The real communication device may be configured to communicate with other real communication devices via one or more communication channels that are independent of the virtual world.

By way of example, and without loss of generality, the virtual world may optionally comprise a simulated public space configured to facilitate interaction among a plurality of users and one or more private spaces. Each private space is associated with a particular user of the plurality of users, e.g., as described above.

Recorded or synthesized speech may be associated with the email and presented with the one or more images at the destination. The avatar images may comprise an animation of the avatar generated specifically for the email. The animation may be presented at the destination, e.g., by self-extracting email attachment. In addition, one or more gestures may be mapped to the animation of the avatar, e.g., as described above. The gestures may be mapped by recording audio and/or video of a source of the email message and mapping one or more features of the audio and/or video to one or more features of the avatar in the animation.

In some embodiments a theme may be associated with virtual camera movements in the animation. By way of example, and without limitation, the theme may involve choice of virtual camera angle, tracking, panning, tilting, zoom, close-up, simulated lighting, and the like. The virtual camera position may be fixed or moving. In addition, the theme may involve a choice of background scenery for the avatar.

In some embodiments, generating the email may involve tracking an emotional state of the source, e.g., as described above, and mapping the emotional state to the theme. For example, a serene or calm emotional state may be mapped to a theme characterized by fixed camera position or relatively slow virtual camera movement. An agitated or excited emotional state may be mapped to a theme characterized by jarring camera movement, extreme close-ups, harsh camera angles, and the like.

Avatar email communications of the type described above may be implemented, e.g., by appropriate configuration of the system 20 of FIG. 1E and/or the multimedia apparatus 102 of FIG. 1F and FIG. 2A.

Figure 3:
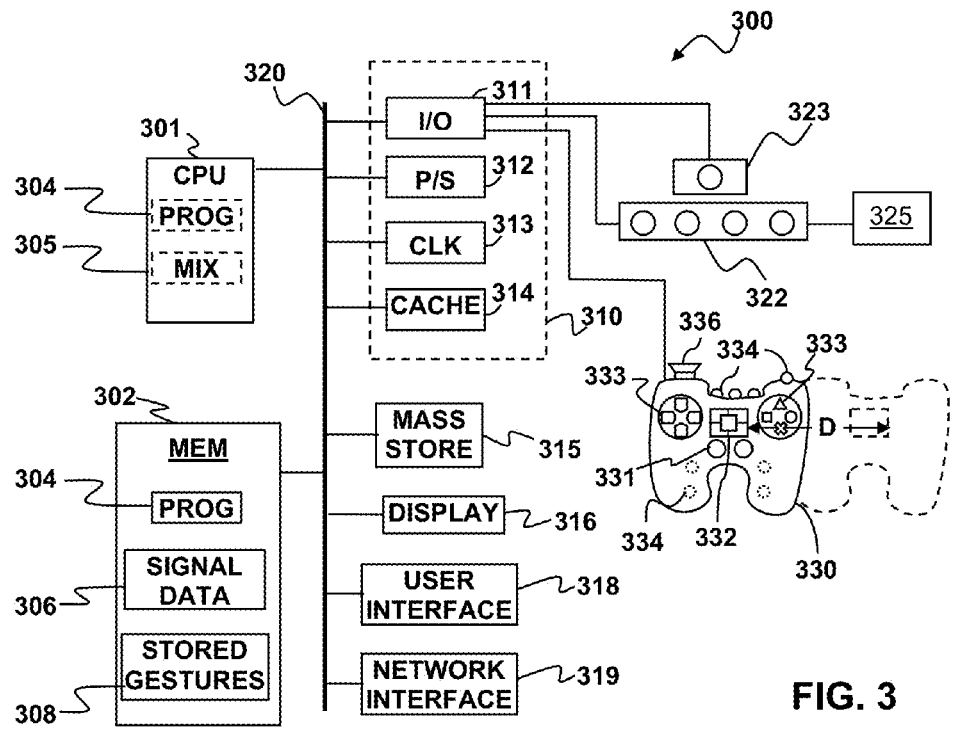
FIG. 3 is a block diagram illustrating a video game apparatus that may be used to interface with a virtual world according to an embodiment of the present invention.

According to embodiments of the present invention, virtual world systems and methods of the type described above may be implemented using a console video game apparatus as a client device 28 and a user interface for interacting with the virtual world, e.g., as generated by elements of the system 20. As depicted in FIG. 3, a console video game apparatus 300 may include a processor 301 and a memory 302 (e.g., RAM, DRAM, ROM, and the like). In addition, the video game apparatus 300 may have multiple processors 301 if parallel processing is to be implemented. The memory 302 includes data and game program code 304, which may include portions that facilitate user interaction with a virtual world as described above. Specifically, the memory 302 may include inertial signal data 306 which may include stored controller path information as described above. The memory 302 may also contain stored gesture data 308, e.g., data representing one or more gestures relevant to the game program 304. Coded instructions executed on the processor 302 may implement a multi-input mixer 305, which may be configured and function as described above.

The apparatus 300 may also include well-known support functions 310, such as input/output (I/O) elements 311, power supplies (P/S) 312, a clock (CLK) 313 and cache 314. The apparatus 300 may optionally include a mass storage device 315 such as a disk drive, CD-ROM drive, tape drive, or the like to store programs and/or data. The controller may also optionally include a display unit 316 and input unit 318 to facilitate interaction between the apparatus 300 and a user. The display unit 316 may be in the form of a cathode ray tube (CRT) or flat panel screen that displays text, numerals, graphical symbols or images. The user interface 318 may include a keyboard, mouse, joystick, light pen or other device. In addition, the user input 318 may include a microphone, video camera or other signal transducing device to provide for direct capture of a signal to be analyzed. The apparatus 300 may also include a network interface 319 to enable the device to communicate with virtual world servers and other similarly configured devices over a network, such as the internet. The processor 301, memory 302, user input 318, network interface 319 and other components of the apparatus 300 may exchange signals (e.g., code instructions and data) with each other via a system bus 320 as shown in FIG. 3.

A microphone array 322 may be coupled to the system 300 through the I/O functions 311. The microphone array may include between about 2 and about 8 microphones, preferably about 4 microphones with neighboring microphones separated by a distance of less than about 4 centimeters, preferably between about 1 centimeter and about 2 centimeters. Preferably, the microphones in the array 322 are omni-directional microphones. An optional image capture unit 323 (e.g., a digital camera) may be coupled to the apparatus 300 through the I/O functions 311. One or more pointing actuators 325 may be mechanically coupled to the camera to control pointing of the image capture unit. These actuators 325 may exchange signals with the processor 301 via the I/O functions 311.

As used herein, the term I/O generally refers to any program, operation or device that transfers data to or from the apparatus 300 and to or from a peripheral device. Every data transfer may be regarded as an output from one device and an input into another. Peripheral devices include input-only devices, such as keyboards and mouses, output-only devices, such as printers as well as devices such as a writable CD-ROM that can act as both an input and an output device. The term "peripheral device" includes external devices, such as a mouse, keyboard, printer, monitor, microphone, game controller, camera, external Zip drive or scanner as well as internal devices, such as a CD-ROM drive, CD-R drive or internal modem or other peripheral such as a flash memory reader/writer, hard drive.

In certain embodiments of the invention, the apparatus 300 may include a controller 330 coupled to the processor via the I/O functions 311 either through wires (e.g., a USB cable) or wirelessly, e.g., using infrared or radiofrequency (such as Bluetooth) connections. The controller 330 may have analog joystick controls 331 and conventional buttons 333 that provide control signals commonly used during playing of video games. Such video games may be implemented as processor readable data and/or instructions from the program 304 which may be stored in the memory 302 or other processor readable medium such as one associated with the mass storage device 315.

The joystick controls 331 may generally be configured so that moving a control stick left or right signals movement along the X axis, and moving it forward (up) or back (down) signals movement along the Y axis. In joysticks that are configured for three-dimensional movement, twisting the stick left (counter-clockwise) or right (clockwise) may signal movement along the Z axis. These three axis—X Y and Z—are often referred to as roll, pitch, and yaw, respectively, particularly in relation to an aircraft.

In addition to conventional features, the controller 330 may include one or more inertial sensors 332, which may provide position and/or orientation information to the processor 301 via an inertial signal. Orientation information may include angular information such as a tilt, roll or yaw of the controller 330. By way of example, the inertial sensors 332 may include any number and/or combination of accelerometers, gyroscopes or tilt sensors. In a preferred embodiment, the inertial sensors 332 include tilt sensors adapted to sense orientation of the joystick controller with respect to tilt and roll axes, a first accelerometer adapted to sense acceleration along a yaw axis and a second accelerometer adapted to sense angular acceleration with respect to the yaw axis. An accelerometer may be implemented, e.g., as a MEMS device including a mass mounted by one or more springs with sensors for sensing displacement of the mass relative to one or more directions. Signals from the sensors that are dependent on the displacement of the mass may be used to determine an acceleration of the joystick controller 330. Such techniques may be implemented by instructions from the game program 304 which may be stored in the memory 302 and executed by the processor 301.

By way of example an accelerometer suitable as the inertial sensor 332 may be a simple mass elastically coupled at three or four points to a frame, e.g., by springs. Pitch and roll axes lie in a plane that intersects the frame, which is mounted to the joystick controller 330. As the frame (and the joystick controller 330) rotates about pitch and roll axes the mass will displace under the influence of gravity and the springs will elongate or compress in a way that depends on the angle of pitch and/or roll. The displacement and of the mass can be sensed and converted to a signal that is dependent on the amount of pitch and/or roll. Angular acceleration about the yaw axis or linear acceleration along the yaw axis may also produce characteristic patterns of compression and/or elongation of the springs or motion of the mass that can be sensed and converted to signals that are dependent on the amount of angular or linear acceleration. Such an accelerometer device can measure tilt, roll angular acceleration about the yaw axis and linear acceleration along the yaw axis by tracking movement of the mass or compression and expansion forces of the springs. There are a number of different ways to track the position of the mass and/or or the forces exerted on it, including resistive strain gauge material, photonic sensors, magnetic sensors, hall-effect devices, piezoelectric devices, capacitive sensors, and the like.

In addition, the joystick controller 330 may include one or more light sources 334, such as light emitting diodes (LEDs). The light sources 334 may be used to distinguish one controller from the other. For example one or more LEDs can accomplish this by flashing or holding an LED pattern code. By way of example, 5 LEDs can be provided on the joystick controller 330 in a linear or two-dimensional pattern. Although a linear array of LEDs is preferred, the LEDs may alternatively, be arranged in a rectangular pattern or an arcuate pattern to facilitate determination of an image plane of the LED array when analyzing an image of the LED pattern obtained by the image capture unit 323. Furthermore, the LED pattern codes may also be used to determine the positioning of the joystick controller 330 during game play. For instance, the LEDs can assist in identifying tilt, yaw and roll of the controllers. This detection pattern can assist in providing a better user/feel in games, such as aircraft flying games, etc. The image capture unit 323 may capture images containing the joystick controller 330 and light sources 334. Analysis of such images can determine the location and/or orientation of the joystick controller. Such analysis may be implemented by program code instructions 304 stored in the memory 302 and executed by the processor 301. To facilitate capture of images of the light sources 334 by the image capture unit 323, the light sources 334 may be placed on two or more different sides of the joystick controller 330, e.g., on the front and on the back (as shown in phantom). Such placement allows the image capture unit 323 to obtain images of the light sources 334 for different orientations of the joystick controller 330 depending on how the joystick controller 330 is held by a user.

In addition the light sources 334 may provide telemetry signals to the processor 301, e.g., in pulse code, amplitude modulation or frequency modulation format. Such telemetry signals may indicate which joystick buttons are being pressed and/or how hard such buttons are being pressed. Telemetry signals may be encoded into the optical signal, e.g., by pulse coding, pulse width modulation, frequency modulation or light intensity (amplitude) modulation. The processor 301 may decode the telemetry signal from the optical signal and execute a game command in response to the decoded telemetry signal. Telemetry signals may be decoded from analysis of images of the joystick controller 330 obtained by the image capture unit 323. Alternatively, the apparatus 301 may include a separate optical sensor dedicated to receiving telemetry signals from the lights sources 334. The use of LEDs in conjunction with determining an intensity amount in interfacing with a computer program is described, e.g., in U.S. patent application Ser. No. 11/429,414, to Richard L. Marks et al., entitled "USE OF COMPUTER IMAGE AND AUDIO PROCESSING IN DETERMINING AN INTENSITY AMOUNT WHEN INTERFACING WITH A COMPUTER PROGRAM", filed May 4, 2006, which is incorporated herein by reference in its entirety. In addition, analysis of images containing the light sources 334 may be used for both telemetry and determining the position and/or orientation of the joystick controller 330. Such techniques may be implemented by instructions of the program 304 which may be stored in the memory 302 and executed by the processor 301.

The processor 301 may use the inertial signals from the inertial sensor 332 in conjunction with optical signals from light sources 334 detected by the image capture unit 323 and/or sound source location and characterization information from acoustic signals detected by the microphone array 322 to deduce information on the location and/or orientation of the controller 330 and/or its user. For example, "acoustic radar" sound source location and characterization may be used in conjunction with the microphone array 322 to track a moving voice while motion of the joystick controller is independently tracked (through the inertial sensor 332 and or light sources 334). In acoustic radar a pre-calibrated listening zone is selected at runtime and sounds originating from sources outside the pre-calibrated listening zone are filtered out. The pre-calibrated listening zones may include a listening zone that corresponds to a volume of focus or field of view of the image capture unit 323. Examples of acoustic radar are described in detail in U.S. patent application Ser. No. 11/381,724, to Xiadong Mao entitled "METHODS AND APPARATUS FOR TARGETED SOUND DETECTION AND CHARACTERIZATION", filed May 4, 2006, which is incorporated herein by reference.

Any number of different combinations of different modes of providing control signals to the processor 301 may be used in conjunction with embodiments of the present invention. Such techniques may be implemented by program code instructions 304 which may be stored in the memory 302 and executed by the processor 301 and may optionally include one or more instructions that direct the one or more processors to select a pre-calibrated listening zone at runtime and filter out sounds originating from sources outside the pre-calibrated listening zone. The pre-calibrated listening zones may include a listening zone that corresponds to a volume of focus or field of view of the image capture unit 323.

The program 304 may optionally include one or more instructions that direct the one or more processors to produce a discrete time domain input signal $x_m(t)$ from microphones $M_0 \ldots M_M$, of the microphone array 322, determine a listening sector, and use the listening sector in a semi-blind source separation to select the finite impulse response filter coefficients to separate out different sound sources from input signal $x_m(t)$. The program 304 may also include instructions to apply one or more fractional delays to selected input signals $X_m(t)$ other than an input signal $x_0(t)$ from a reference microphone $M_0$. Each fractional delay may be selected to optimize a signal to noise ratio of a discrete time domain output signal y(t) from the microphone array. The fractional delays may be selected to such that a signal from the reference microphone $M_0$ is first in time relative to signals from the other microphone(s) of the array. The program 304 may also include instructions to introduce a fractional time delay $\Delta$ into an output signal y(t) of the microphone array so that: $y(t+\Delta) = x(t+\Delta)*b_0 + x(t-1+\Delta)*b_1 + x(t-2+\Delta)*b_2 + \ldots + x(t-N+\Delta)b_N$, where $\Delta$ is between zero and ±1. Examples of such techniques are described in detail in U.S. patent application Ser. No. 11/381,729, to Xiadong Mao, entitled "ULTRA SMALL MICROPHONE ARRAY" filed May 4, 2006, the entire disclosures of which are incorporated by reference.

The program 304 may include one or more instructions which, when executed, cause the system 300 to select a pre-calibrated listening sector that contains a source of sound. Such instructions may cause the apparatus to determine whether a source of sound lies within an initial sector or on a particular side of the initial sector. If the source of sound does not lie within the default sector, the instructions may, when executed, select a different sector on the particular side of the default sector. The different sector may be characterized by an attenuation of the input signals that is closest to an optimum value. These instructions may, when executed, calculate an attenuation of input signals from the microphone array 322 and the attenuation to an optimum value. The instructions may, when executed, cause the apparatus 300 to determine a value of an attenuation of the input signals for one or more sectors and select a sector for which the attenuation is closest to an optimum value. Examples of such a technique are described, e.g., in U.S. patent application Ser. No. 11/381, 725, to Xiadong Mao, entitled "METHODS AND APPARATUS FOR TARGETED SOUND DETECTION" filed May 4, 2006, the disclosures of which are incorporated herein by reference.

Signals from the inertial sensor 332 may provide part of a tracking information input and signals generated from the image capture unit 323 from tracking the one or more light sources 334 may provide another part of the tracking information input. By way of example, and without limitation, such "mixed mode" signals may be used in a football type video game in which a Quarterback pitches the ball to the right after a head fake head movement to the left. Specifically, a game player holding the controller 330 may turn his head to the left and make a sound while making a pitch movement swinging the controller out to the right like it was the football. The microphone array 322 in conjunction with "acoustic radar" program code can track the user's voice. The image capture unit 323 can track the motion of the user's head or track other commands that do not require sound or use of the controller. The sensor 332 may track the motion of the joystick controller (representing the football). The image capture unit 323 may also track the light sources 334 on the controller 330. The user may release of the "ball" upon reaching a certain amount and/or direction of acceleration of the joystick controller 330 or upon a key command triggered by pressing a button on the controller 330.

In certain embodiments of the present invention, an inertial signal, e.g., from an accelerometer or gyroscope may be used to determine a location of the controller 330. Specifically, an acceleration signal from an accelerometer may be integrated once with respect to time to determine a change in velocity and the velocity may be integrated with respect to time to determine a change in position. If values of the initial position and velocity at some time are known then the absolute position may be determined using these values and the changes in velocity and position. Although position determination using an inertial sensor may be made more quickly than using the image capture unit 323 and light sources 334 the inertial sensor 332 may be subject to a type of error known as "drift" in which errors that accumulate over time can lead to a discrepancy D between the position of the joystick 330 calculated from the inertial signal (shown in phantom) and the actual position of the joystick controller 330. Embodiments of the present invention allow a number of ways to deal with such errors.

For example, the drift may be cancelled out manually by re-setting the initial position of the controller 330 to be equal to the current calculated position. A user may use one or more of the buttons on the controller 330 to trigger a command to re-set the initial position. Alternatively, image-based drift may be implemented by re-setting the current position to a position determined from an image obtained from the image capture unit 323 as a reference. Such image-based drift compensation may be implemented manually, e.g., when the user triggers one or more of the buttons on the joystick controller 330. Alternatively, image-based drift compensation may be implemented automatically, e.g., at regular intervals of time or in response to game play. Such techniques may be implemented by program code instructions 304 which may be stored in the memory 302 and executed by the processor 301.

In certain embodiments it may be desirable to compensate for spurious data in the inertial sensor signal. For example the signal from the inertial sensor 332 may be oversampled and a sliding average may be computed from the oversampled signal to remove spurious data from the inertial sensor signal. In some situations it may be desirable to oversample the signal and reject a high and/or low value from some subset of data points and compute the sliding average from the remaining data points. Furthermore, other data sampling and manipulation techniques may be used to adjust the signal from the inertial sensor to remove or reduce the significance of spurious data. The choice of technique may depend on the nature of the signal, computations to be performed with the signal, the nature of game play or some combination of two or more of these. Such techniques may be implemented by instructions of the program 304 which may be stored in the memory 302 and executed by the processor 301.

The processor 301 may perform analysis of inertial signal data 306 as described above in response to the data 306 and program code instructions of a program 304 stored and retrieved by the memory 302 and executed by the processor module 301. In addition, the processor may implement certain virtual world simulation functions described above as part of the program 304. Specifically, the program 304 may all or part of various methods for communicating with a virtual world and/or methods for interaction with a three-dimensional virtual world and/or avatar email communication as described above. Code portions of the program 304 may conform to any one of a number of different programming languages such as Assembly, C++, JAVA or a number of other languages. The processor module 301 forms a general-purpose computer that becomes a specific purpose computer when executing programs such as the program code 304. Although the program code 304 is described herein as being implemented in software and executed upon a general purpose computer, those skilled in the art will realize that the method of task management could alternatively be implemented using hardware such as an application specific integrated circuit (ASIC) or other hardware circuitry. As such, it should be understood that embodiments of the invention can be implemented, in whole or in part, in software, hardware or some combination of both.

In one embodiment, among others, the program code 304 may include a set of processor readable instructions that direct the one or more processors to analyze signals from the inertial sensor 332 to generate position and/or orientation information and utilize the information during play of a video game, during communication with a virtual world or during interaction with a three-dimensional virtual world. The program code 304 may optionally include processor executable instructions including one or more instructions which, when executed cause the image capture unit 323 to monitor a field of view in front of the image capture unit 323, identify one or more of the light sources 334 within the field of view, detect a change in light emitted from the light source(s) 334; and in response to detecting the change, triggering an input command to the processor 301. The use of LEDs in conjunction with an image capture device to trigger actions in a game controller is described e.g., in U.S. patent application Ser. No. 10/759,782 to Richard L. Marks, filed Jan. 16, 2004 and entitled: METHOD AND APPARATUS FOR LIGHT INPUT DEVICE, which is incorporated herein by reference in its entirety.

The program code 304 may optionally include processor executable instructions including one or more instructions which, when executed, use signals from the inertial sensor and signals generated from the image capture unit from tracking the one or more light sources as inputs to a game system, e.g., as described above. The program code 304 may optionally include processor executable instructions including one or more instructions which, when executed compensate for drift in the inertial sensor 332.

Although embodiments of the present invention are described in terms of examples related to a video game controller 330 games, embodiments of the invention, including the system 300 may be used on any user manipulated body, molded object, knob, structure, etc, with inertial sensing capability and inertial sensor signal transmission capability, wireless or otherwise.

Figure 4:
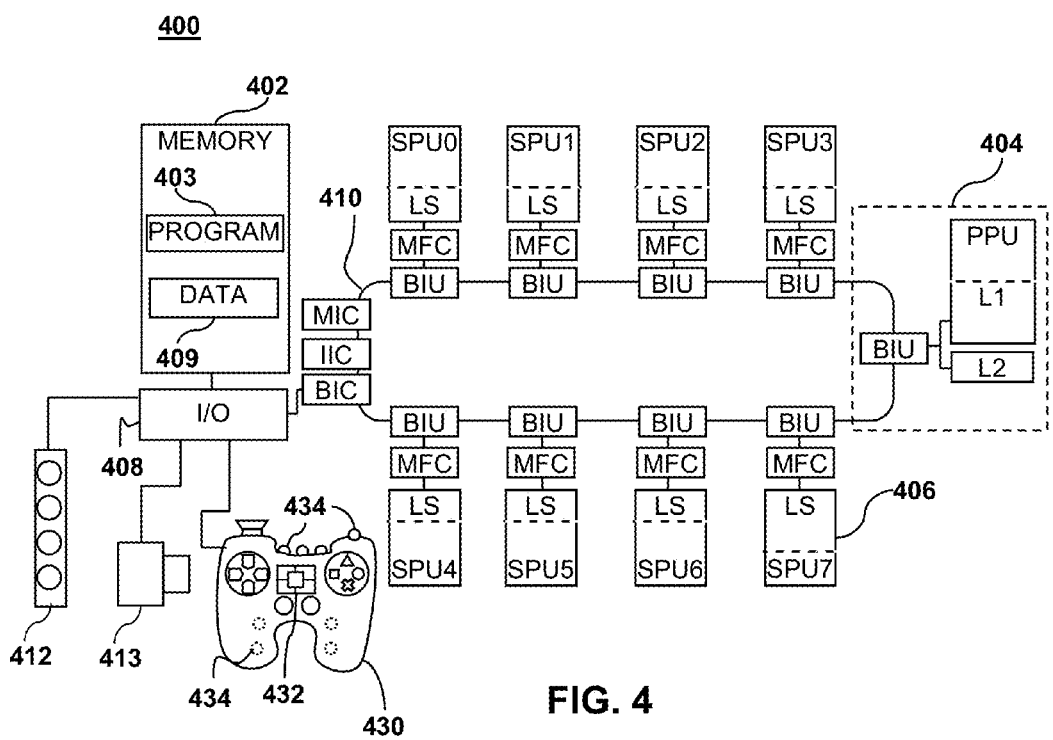
FIG. 4 is a block diagram of a cell processor implementation of a video game apparatus according to an embodiment of the present invention.

By way of example, embodiments of the present invention may be implemented on parallel processing systems. Such parallel processing systems typically include two or more processor elements that are configured to execute parts of a program in parallel using separate processors. By way of example, and without limitation, FIG. 4 illustrates a type of cell processor 400 according to an embodiment of the present invention. The cell processor 400 may be used as the processor 301 of FIG. 3 or in the simulation servers 22 or view servers 24 of FIG. 1E. In the example depicted in FIG. 4, the cell processor 400 includes a main memory 402, power processor element (PPE) 404, and a number of synergistic processor elements (SPEs) 406. In the example depicted in FIG. 4, the cell processor 400 includes a single PPE 404 and eight SPE 406. In such a configuration, seven of the SPE 406 may be used for parallel processing and one may be reserved as a back-up in case one of the other seven fails. A cell processor may alternatively include multiple groups of PPEs (PPE groups) and multiple groups of SPEs (SPE groups). In such a case, hardware resources can be shared between units within a group. However, the SPEs and PPEs must appear to software as independent elements. As such, embodiments of the present invention are not limited to use with the configuration shown in FIG. 4.

The main memory 402 typically includes both general-purpose and nonvolatile storage, as well as special-purpose hardware registers or arrays used for functions such as system configuration, data-transfer synchronization, memory-mapped I/O, and I/O subsystems. In embodiments of the present invention, a video game program 403 may be resident in main memory 402. The video program 403 may include inertial, image and acoustic analyzers and a mixer or some combination of these. The program 403 may run on the PPE. The program 403 may be divided up into multiple signal processing tasks that can be executed on the SPEs and/or PPE By way of example, the PPE 404 may be a 64-bit PowerPC Processor Unit (PPU) with associated caches L1 and L2. The PPE 404 is a general-purpose processing unit, which can access system management resources (such as the memory-protection tables, for example). Hardware resources may be mapped explicitly to a real address space as seen by the PPE. Therefore, the PPE can address any of these resources directly by using an appropriate effective address value. A primary function of the PPE 404 is the management and allocation of tasks for the SPEs 406 in the cell processor 400.

Although only a single PPE is shown in FIG. 4, some cell processor implementations, such as cell broadband engine architecture (CBEA), the cell processor 400 may have multiple PPEs organized into PPE groups, of which there may be more than one. These PPE groups may share access to the main memory 402. Furthermore the cell processor 400 may include two or more groups SPEs. The SPE groups may also share access to the main memory 402. Such configurations are within the scope of the present invention.

Each SPE 406 is includes a synergistic processor unit (SPU) and its own local storage area LS. The local storage LS may include one or more separate areas of memory storage, each one associated with a specific SPU. Each SPU may be configured to only execute instructions (including data load and data store operations) from within its own associated local storage domain. In such a configuration, data transfers between the local storage LS and elsewhere in the system 400 may be performed by issuing direct memory access (DMA) commands from the memory flow controller (MFC) to transfer data to or from the local storage domain (of the individual SPE). The SPUs are less complex computational units than the PPE 404 in that they do not perform any system management functions. The SPU generally have a single instruction, multiple data (SIMD) capability and typically process data and initiate any required data transfers (subject to access properties set up by the PPE) in order to perform their allocated tasks. The purpose of the SPU is to enable applications that require a higher computational unit density and can effectively use the provided instruction set. A significant number of SPEs in a system managed by the PPE 404 allow for cost-effective processing over a wide range of applications.

Each SPE 406 may include a dedicated memory flow controller (MFC) that includes an associated memory management unit that can hold and process memory-protection and access-permission information. The MFC provides the primary method for data transfer, protection, and synchronization between main storage of the cell processor and the local storage of an SPE. An MFC command describes the transfer to be performed. Commands for transferring data are sometimes referred to as MFC direct memory access (DMA) commands (or MFC DMA commands).

Each MFC may support multiple DMA transfers at the same time and can maintain and process multiple MFC commands. Each MFC DMA data transfer command request may involve both a local storage address (LSA) and an effective address (EA). The local storage address may directly address only the local storage area of its associated SPE. The effective address may have a more general application, e.g., it may be able to reference main storage, including all the SPE local storage areas, if they are aliased into the real address space.

To facilitate communication between the SPEs 406 and/or between the SPEs 406 and the PPE 404, the SPEs 406 and PPE 404 may include signal notification registers that are tied to signaling events. The PPE 404 and SPEs 406 may be coupled by a star topology in which the PPE 404 acts as a router to transmit messages to the SPEs 406. Alternatively, each SPE 406 and the PPE 404 may have a one-way signal notification register referred to as a mailbox. The mailbox can be used by an SPE 406 to host operating system (OS) synchronization.

The cell processor 400 may include an input/output (I/O) function 408 through which the cell processor 400 may interface with peripheral devices, such as a microphone array 412 and optional image capture unit 413 and a game/virtual world controller 430. The controller unit 430 may include an inertial sensor 432, and light sources 434. In addition an Element Interconnect Bus 410 may connect the various components listed above. Each SPE and the PPE can access the bus 410 through a bus interface units BIU. The cell processor 400 may also includes two controllers typically found in a processor: a Memory Interface Controller MIC that controls the flow of data between the bus 410 and the main memory 402, and a Bus Interface Controller BIC, which controls the flow of data between the I/O 408 and the bus 410. Although the requirements for the MIC, BIC, BIUs and bus 410 may vary widely for different implementations, those of skill in the art will be familiar their functions and circuits for implementing them.

The cell processor 400 may also include an internal interrupt controller IIC. The IIC component manages the priority of the interrupts presented to the PPE. The IIC allows interrupts from the other components the cell processor 400 to be handled without using a main system interrupt controller. The IIC may be regarded as a second level controller. The main system interrupt controller may handle interrupts originating external to the cell processor.

In embodiments of the present invention, certain computations that facilitate interaction with the virtual world, may be performed in parallel using the PPE 404 and/or one or more of the SPE 406. Such computations may be run as one or more separate tasks that different SPE 406 may take as they become available.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A" or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method, comprising:
    associating an avatar with a source of an email;
    generating an email within a virtual world;
    generating the animation of an avatar, wherein generating the email comprises tracking an emotional state of a source of the email and mapping the emotional state to the animation;
    associating the animation of the avatar with the email;
    sending the email to a real device;
    and presenting the animation at a destination of the email.
2. The method of claim 1, further comprising associating recorded or synthesized speech with the email and presenting the speech with the one or more images at the destination.

3. The method claim 1, wherein associating the animation of the avatar further comprises mapping one or more gestures to the animation of the avatar.
4. The method of claim 3, wherein mapping one or more gestures comprises recording audio and/or video of a source of the email message and mapping one or more features of the audio and/or video to one or more features of the avatar in the animation.
5. The method of claim 1, further comprising associating a theme with virtual camera movements in the animation.
6. The method of claim 5 wherein the theme comprises a fixed position of a virtual camera.
7. The method of claim 5 wherein the theme comprises movement of a virtual camera.
8. The method of claim 1 wherein generating an email comprises using a virtual communication device within the virtual world.
9. The method of claim 1 wherein the virtual world comprises a simulated public space configured to facilitate interaction among a plurality of users and one or more private spaces, wherein each private space is associated with a particular user of the plurality of users.
10. The method of claim 1 wherein the destination is a real communication device.
11. The method of claim 10 wherein the real communication device is configured to communicate with other real communication devices via one or more communication channels that are independent of the virtual world.
12. A system, comprising:
    one or more processors configured to:
    generate a virtual world;
    associate an avatar with a source of an email;
    generate an email within the virtual world, wherein generating the email comprises tracking an emotional state of a source of the email and mapping the emotional state to the animation;
    generate the animation of an avatar;
    associate the animation of the avatar with the email;
    send the email to a real device;
    and present the animation at a destination of the email.
13. The system of claim 12 wherein the virtual world comprises a simulated public space configured to facilitate interaction among a plurality of users and one or more private spaces, wherein each private space is associated with a particular user of the plurality of users.
14. The system of claim 12, wherein the one or more processors are configured to generate associate recorded and/or synthesized speech with the email and present the speech with the one or more images at the destination.
15. The system of claim 12, wherein the one or more processors are configured to map one or more gestures to the animation of the avatar.
16. The system of claim 15, wherein the one or more processors are configured to generate record audio and/or video of a source of the email message and map one or more features of the audio and/or video to one or more features of the avatar in the animation.
17. The system of claim 12, wherein the one or more processors are configured to associate a theme with virtual camera movements in the animation.
18. The system of claim 17 wherein the theme comprises a fixed position of a virtual camera.
19. The system of claim 17 wherein the theme comprises movement of a virtual camera.
20. The system of claim 17, wherein the one or more processors are configured to track an emotional state of the source and map the theme to emotional state.

21. The system of claim 12 wherein the one or more processors are configured to generate a virtual communication device within the virtual world and allow a user to generate the email with the virtual communication device.

22. A method for communicating using a virtual world, comprising:
   associating an avatar with a source of an email;
   generating an email within the virtual world;
   generating the animation of an avatar;
   associating the animation of the avatar with the email, wherein associating the animation of the avatar with the email includes attaching the animation to the email as a self-extracting attachment;
   sending the email to a real device;
   and presenting the animation at a destination of the email.

23. A system, comprising:
   one or more processors configured to:
   generate a virtual world;
   associate an avatar with a source of an email;
   generate an email within the virtual world;
   generate the animation of an avatar;
   associate the animation of the avatar with the email wherein the one or more processors are configured to associate the animation of the avatar with the email by attaching the animation to the email as a self-extracting attachment;
   send the email to a real device;
   and present the animation at a destination of the email.

* * * * *